US012524800B2

(12) United States Patent
Dasher et al.

(10) Patent No.: US 12,524,800 B2
(45) Date of Patent: *Jan. 13, 2026

(54) SPATIALLY AUGMENTED AUDIO AND XR CONTENT WITHIN AN E-COMMERCE SHOPPING EXPERIENCE

(71) Applicant: Adeia Guides Inc., San Jose, CA (US)

(72) Inventors: Charles Dasher, Lawrenceville, GA (US); Christopher Phillips, Hartwell, GA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 18/373,572

(22) Filed: Sep. 27, 2023

(65) Prior Publication Data

US 2025/0104132 A1    Mar. 27, 2025

(51) Int. Cl.
*G06Q 30/0601* (2023.01)
*G06F 3/16* (2006.01)

(52) U.S. Cl.
CPC ......... *G06Q 30/0641* (2013.01); *G06F 3/162* (2013.01); *G06Q 30/0625* (2013.01)

(58) Field of Classification Search
CPC . G06Q 30/0641; G06Q 30/0625; G06F 3/162
See application file for complete search history.

(56) References Cited

U.S. PATENT DOCUMENTS

| | | |
|---|---|---|
| 8,917,971 B2 | 12/2014 | Woods et al. |
| 9,237,368 B2 * | 1/2016 | Davis ................. H04N 21/4782 |
| 9,532,100 B2 | 12/2016 | Ehlers et al. |
| 10,175,177 B2 | 1/2019 | Olsson et al. |
| 10,685,217 B2 | 6/2020 | Purandare et al. |
| 11,457,245 B1 * | 9/2022 | Bhatia ................... H04N 21/235 |
| 11,606,220 B2 | 3/2023 | Jorasch et al. |

(Continued)

OTHER PUBLICATIONS

Iyer, Prakash, "The science behind Echo Show 10," Amazon Science, https://www.amazon.science/blog/the-science-behind-echo-show-10 (2020).

(Continued)

*Primary Examiner* — Waseem Ashraf
(74) *Attorney, Agent, or Firm* — HALEY GUILIANO LLP

(57) ABSTRACT

Systems and methods are presented herein for creating and rendering supplemental content of a selectable product icon of an e-commerce interface in response to user interaction with the selectable product icon. A list of products with a plurality of selectable icons is retrieved from a server based on at least one parameter of a query from an identified first device. The first device is determined to be communicatively coupled to at least one secondary device. Using an artificial intelligence generative engine, supplemental content corresponding to one or more products is generated based on device information of the at least one secondary device. In response to determining that a position of the at least one selectable icon is within a threshold distance of the subset of the list of products displayed or is being displayed, instructions are transmitted to the at least one secondary device to render the supplemental content.

14 Claims, 21 Drawing Sheets

(56) References Cited

U.S. PATENT DOCUMENTS

| | | | |
|---|---|---|---|
| 11,635,883 B2* | 4/2023 | Farrell | G06F 16/22 |
| | | | 715/783 |
| 11,902,625 B2* | 2/2024 | Chandrashekar | H04N 21/4532 |
| 12,311,171 B2* | 5/2025 | Meskens | A61N 1/36036 |
| 2003/0158796 A1 | 8/2003 | Balent | |
| 2004/0133518 A1* | 7/2004 | Dryall | G06Q 30/02 |
| | | | 705/50 |
| 2008/0226119 A1 | 9/2008 | Candelore et al. | |
| 2008/0279481 A1 | 11/2008 | Ando | |
| 2009/0063307 A1 | 3/2009 | Groenovelt et al. | |
| 2009/0128335 A1 | 5/2009 | Leung | |
| 2009/0154744 A1 | 6/2009 | Snyder | |
| 2009/0254447 A1 | 10/2009 | Blades | |
| 2010/0046842 A1 | 2/2010 | Conwell | |
| 2010/0184375 A1 | 7/2010 | Ohkita | |
| 2011/0107220 A1 | 5/2011 | Perlman | |
| 2011/0164121 A1 | 7/2011 | Ikeda et al. | |
| 2011/0221657 A1 | 9/2011 | Haddick et al. | |
| 2012/0105608 A1 | 5/2012 | Ko | |
| 2012/0256954 A1 | 10/2012 | Soon-Shiong | |
| 2012/0290366 A1 | 11/2012 | Giles | |
| 2013/0072301 A1 | 3/2013 | Mallinson | |
| 2013/0127980 A1 | 5/2013 | Haddick et al. | |
| 2013/0179303 A1 | 7/2013 | Petrou et al. | |
| 2013/0347018 A1* | 12/2013 | Limp | H04N 21/4394 |
| | | | 725/19 |
| 2014/0028712 A1 | 1/2014 | Keating et al. | |
| 2014/0089967 A1* | 3/2014 | Mandalia | H04N 21/25891 |
| | | | 725/34 |
| 2014/0100996 A1 | 4/2014 | Klein et al. | |
| 2014/0100997 A1 | 4/2014 | Mayerle et al. | |
| 2014/0143105 A1 | 5/2014 | Shaw et al. | |
| 2014/0152847 A1 | 6/2014 | Zomet et al. | |
| 2014/0195337 A1* | 7/2014 | Taylor | G06Q 30/0277 |
| | | | 705/14.71 |
| 2014/0267907 A1* | 9/2014 | Downes | H04N 21/43072 |
| | | | 348/525 |
| 2015/0031440 A1 | 1/2015 | Desanti et al. | |
| 2015/0110457 A1* | 4/2015 | Abecassis | H04N 21/4394 |
| | | | 386/201 |
| 2016/0026853 A1 | 1/2016 | Wexler et al. | |
| 2016/0070439 A1 | 3/2016 | Bostick et al. | |
| 2016/0259528 A1* | 9/2016 | Foss | G06F 3/0416 |
| 2016/0275031 A1 | 9/2016 | Lee et al. | |
| 2017/0023492 A1 | 1/2017 | Olsson et al. | |
| 2018/0276737 A1 | 9/2018 | Girish et al. | |
| 2019/0007754 A1* | 1/2019 | Master | H04N 21/8547 |
| 2019/0238952 A1* | 8/2019 | Boskovich | H04N 21/858 |
| 2019/0325204 A1 | 10/2019 | Purandare et al. | |
| 2020/0007921 A1* | 1/2020 | Ojala | H04N 21/4345 |
| 2020/0014979 A1* | 1/2020 | Woods | H04N 5/765 |
| 2020/0175573 A1 | 6/2020 | Reddy et al. | |
| 2020/0302510 A1 | 9/2020 | Chachek et al. | |
| 2021/0031106 A1* | 2/2021 | Alderman | A63F 13/35 |
| 2022/0150567 A1* | 5/2022 | Varan | G06V 40/193 |
| 2022/0303381 A1* | 9/2022 | Phillips | G06Q 30/0641 |
| 2023/0316662 A1* | 10/2023 | Singh | G06Q 30/0277 |
| | | | 345/633 |
| 2024/0089680 A1* | 3/2024 | Sheen | H04R 3/12 |
| 2024/0103799 A1* | 3/2024 | Kumpf | G06F 3/165 |
| 2025/0104133 A1 | 3/2025 | Dasher et al. | |
| 2025/0124148 A1* | 4/2025 | Hanson | G06F 3/1423 |

OTHER PUBLICATIONS

Prakash Iyer, "The science behind Echo Show 10" (Amazon Science), (https://www.amazon.science/blog/the-science-behind-echo-show-10), (4 pages).

U.S. Appl. No. 18/373,575, filed Sep. 27, 2023, Charles Dasher.

Vazquez-Alvarez, Yolanda, et al. "Designing interactions with multilevel auditory displays in mobile audio-augmented reality." ACM Transactions on Computer-Human Interaction (TOCHI) 23.1 (2015): 1-30. (Year: 2015).

* cited by examiner

SPATIALLY AUGMENTED AUDIO AND XR CONTENT WITHIN AN E-COMMERCE SHOPPING EXPERIENCE

The present disclosure is directed to systems and methods for augmenting an e-commerce shopping experience for a user based on the user activity, and more particularly, to systems and methods that cause playback of one or more of video or audio while a user is immersed in an e-commerce shopping experience based on one or more of available audio or video presentation devices, a user's current status within the shopping experience, or a user's virtual or physical proximity to a particular interactive element of the e-commerce shopping experience.

SUMMARY

E-commerce platforms typically offer an exclusively visual experience for a user that is browsing one or more interfaces for products to consume. For instance, a user may be shopping for products using a website or application. Video content is sometimes accessible along with an item, or product, description that convey details of the item or product. Accessing this video content requires a user to "stop" browsing. For example, a user may stop or pause scrolling through a product page to ascertain details or presentations, such as videos, of the details in order to watch or view the video content. As such, items which have not yet been presented to the user. This corresponds to a scenario where the user has not scrolled or browsed enough through an interface or web page for a particular item to be presented or for all available items to be presented for display for access via an interactive user interface such as a screen) that meet criteria corresponding to a returned result set (e.g., products or items that match one or more elements of a search query or string of characters either provided or generated based on voice-to-text algorithms) are typically left unviewed by the user due to a variety of factors (e.g., lack of user time, or energy, to review more than one, a plurality, or all search results such that the user is reliant on sorting of the returned result set based on existing search results return scoring or sorting of search results).

In the context of audio synthesis, generative artificial intelligence (hereinafter "AI") may be used for several purposes. For example, one or more of machine learning techniques or transformer models may learn from large datasets and generate unique outputs such as compositions of music, synthetic or artificially generated voices, or even sound effect generation (e.g., providing audio corresponding to a visual display that otherwise would not have a detectable audio output). Audio synthesis AI models have various applications, including realistic speech synthesis for virtual assistants, adaptive music composition for video games, and personalized audio experiences. For example, WaveNet: Developed by DeepMind can generate highly perceivable and comprehensive human-voice sounding text to speech. Other AI models, including OpenAI's Jukebox, can generate music in a variety of genres and artist styles (e.g., inclusive of a number of artists' unique voice patterns and other sounds generated for respective songs).

Systems configured for generative AI outputs require an input, or prompt, to ascertain collections of data to query for elements to use as part of the output generation. E-commerce applications require a user to provide some sort of query, string of characters, or other input to perform a search for a product. These applications typically provide search results of products for sale as well as contextual descriptions (e.g., corresponding to elements of the search query or user preferences corresponding to a particular device or e-commerce application), reviews of particular products (e.g., based on one or more use parameters defined by a user generating the query), and detailed information about the item (e.g., as provided by the source of the item such as a manufacturer or distributor). One or more of the search queries, or the various elements of the results returned in response to the search query, can be considered as inputs, or prompts, for integrating a generative AI system into an immersive e-commerce experience.

Generative AI systems often take one or more of a textual input or an audible input. The audible input is typically converted to text. The text forms a prompt, which describes to the AI system an expected response along with information required to produce the expected response. For example, a prompt may include the string of characters, "Generate an audio file, in wav format, of a small bird singing, make sure to add the sound of wind blowing gently through trees. Include other birds which appear to be in the distance. Make the sound in such a way that the track of the sound may be played after itself to create a seamless and infinite loop." Additionally, methods exist in the art for determining the identity of a user based on the provided input, prompt, or query (e.g., as determined visually using one or more cameras on a device or surrounding interfacing devices, or as determined through voice identification).

A system and method are herein disclosed consisting of a first computing device capable of executing an e-commerce application, "browsing" an e-commerce website, and presenting audio to a user. The system also includes a datastore for storing and supplying pre-existing audio sounds which are associated with items within the e-commerce "shop", as well as application programming interfaces (hereinafter "APIs") and interfaces allowing one or more of applications or users to search for items, browse the resulting data set (e.g., the returned dataset of products and corresponding auxiliary data), and to see detailed information about a particular item within the result set.

Additionally, or alternatively, a generative AI engine (e.g., a machine learning engine configured to generate one or more of synthetic text or synthesized audio) and one or more corresponding models (e.g., machine learning models capable of being one or more of trained, tuned, or queried regarding items available via a particular e-commerce application or a plurality of e-commerce applications accessible by a particular user device or user profile) may be implemented in a particular system in conjunction with a Large Language Model (hereinafter "LLM"), such as OpenAI's ChatGPT, may be utilized to generate one or more of audible descriptions, natural sounding speech from text associated with an item (e.g., utilizing a particular voice profile chosen by a user), or ambient sounds which are contextually associated with the item (e.g., the sound of waves which are associated with a surf board, barking associated with dog related products or dog food, etc.) or the shopper profile.

In certain applications, applications, or user engagement algorithms thereof, may be configured to cause a sound to be associated with a particular shopper, or profile, for one or more e-commerce applications or interfaces. Additionally, or alternatively, interfacing with and communicatively coupling one or more smart devices (e.g., a smart speaker with a microphone such as a smart home assistant) is useful for recording audio during a query (e.g., when a user is generating a prompt) such that the recorded audio is used where applicable during the shopping experience (e.g., as an input, primary or otherwise, to a generative AI audio synthesis engine) such that the recorded audio is used as one or more samples for various audio generation or overall immersive experience enhancement. For example, processing circuitry may be configured to receive and isolate a barking dog to be associated with the user's or shopper's pet such that favorite, past ordered, or potentially enticing products are highlighted in the e-commerce application or interface for user consumption. This audio sampling may, for privacy reasons, require a user to authorize the sample collection or its use.

An aspect of this disclosure for enabling the rendering of the desired immersive shopping experience includes detecting when a user is interacting with an e-commerce application on a first device, such as an end user device that is considered one or more of a mobile device or Extended Reality (XR) headset. Once processing circuitry corresponding to one or more of these devices provides a flag or confirmation that the e-commerce application is in use, the proximity, or presence, of one or more second devices capable of delivering spatial audio content, standard audio content, or light emission is detected based on one or more of local network connection statuses, data transmitted across a network that a plurality of devices are connected to, or one or more flags raised by, for example, the e-commerce application. Each of these second devices may have their technical capabilities and system settings reviewed to ensure the right device is connected, or activated, in order to deliver augmented spatial audio (e.g., headphones which support spatial audio), Extended Reality Content (e.g., an XR headset) and persistence of vision illumination (e.g., a device which is capable of emitting light such as a speaker with light emitting diodes, hereinafter "LEDs," or a projector for presenting supplemental or primary content related to the user's shopping or browsing).

During a shopping, or e-commerce, experience (e.g., such as when using a mobile device, computer, or other end user device to search for and purchase products), audio corresponding to the returned result set (e.g., as retrieved in response to one or more of a text or audio input causing a string of characters to be used to identify relevant items, stores, or products) can be processed by one or more of a spatial audio mixing apparatus or a code module. Once the audio from the returned result set is processed, one or more of these devices can be activated such that the audio is presented to the user from the devices interfacing with or incorporated into a mobile device, computer, tablet, or any other suitable end user device. Additionally, examples of devices that can be connected to an end user device application-based e-commerce shopping experience include such as speakers, smart home assistants, various devices configured for use with either of these devices, and other devices capable of presenting spatial audio (e.g., XR headsets or other wireless, or hard connected, headphones currently in development throughout the market).

These techniques present a number of improvements over the aforementioned approaches being employed in various e-commerce applications and interfaces. For example, the systems of this disclosure may be able to identify the user by using voice, or by using computer vision in one or more communicatively coupled devices, for example, which can identify the speaker or identify persons within the field of view of the one or more communicatively coupled devices. User preferences, including privacy settings or other personalized settings, may be used to determine a user profile for auto connecting output devices, or otherwise tailoring the augmented e-commerce experience where applicable. When the audio and or visual playback device capabilities are known (e.g., when a device advertises, transmits, or otherwise provides indications of the device's ability to process and present spatial audio or XR content), those capabilities may be additionally passed as arguments (e.g., one or more of parameters, criteria, descriptive elements, or combinations thereof for improving an output such that the consumer of the output achieves a threshold level of satisfaction with the experienced output) to the generative AI engine in order to, for example, improve the tailoring of a prompt based on a particular user and their coupled devices, to enable the creation of one or more of spatial audio or XR content (e.g., one or more of 2-dimensional or 3-dimensional interactive objects for user perception or interaction).

In some embodiments, the user's browsing (e.g., scrolling on an interface of an application for enabling a user of an end user device to review a number of results returned in response to a search query for a product) and characterizing behavior thereof (e.g., one or more of a rate of scrolling, an amount of time spent looking at particular products, filters of results selected, or selection of results based on one or more characteristics of the results browsed) may be considered by the generative AI engine. Additionally, or alternatively, these aspects may be inputs for the user by one or more of an audio processor, communicatively coupled to an end user device, or XR hardware, communicatively coupled to one or more of the end user device or the audio processor, to alter various characteristics of the audio or XR content. Examples of characteristics of content to be rendered for user perception include pitch of rendered sound, perceived distance by the user with respect to rendered objects in the case of XR or spatial audio content where the content is purely audible, the level of detail or complexity of one or more of the rendered sound or XR content, or the length of the audio or XR content (e.g., such that the most influential aspect of the rendered content is presented for perception by the user before the user is expected to lose interest or move on without engaging the rendered content or pursuing details of a product, with intent to purchase).

In some embodiments, parameters for one or more of initiating or maintaining an audio connection (e.g., Bluetooth or other wireless audio connection protocol corresponding to a local wireless connection or a connection enabled by a network with a wider range of coverage than a local network) may be stored within one or more e-commerce applications, e-commerce web sites, or user profile (e.g., as affiliated with one or more of a particular end user device, application, or web site) to enable the e-commerce application to automatically connect to devices which are known to a particular application (e.g., where the application has been used by a same user or user profile across multiple end user devices). In some embodiments, these parameters may be stored locally on an end user device or are stored via one or more servers or storages means affiliated with or corresponding to a particular user profile (e.g., as determined based on repeated use across one or more of multiple end user devices, applications, or web sites).

In some embodiments, an input is received via a user interface generated on the device corresponding to the query, wherein the query corresponds to a request for at least one product. The list of products may be generated for display on the device screen as a variable interface comprising selectable product icons configured to be modified based on subsequent inputs. In some embodiments, the subsequent input corresponds to a scrolling input for modifying display of the list of products on the device screen or the subsequent input corresponds to a selection of at least one selectable product icon. The at least one selectable product icon may comprise one or more of an image of a product, a string of characters describing the product, or a logo. In some embodiments, wherein the supplemental content comprises audio content or one or more of at least one image or at least one video frame.

In some embodiments, the method further includes determining a point of focus of a user in response to generating the list of products for display on the device screen based on one or more of subsequent user input or eye tracking data. The point of focus is compared to a location of the at least one selectable product icon that comprises supplemental content on the list of products. In response to determining, based on the comparing, that the point of focus includes a portion of the list of products comprising the at least one selectable product icon, the at least selectable product icon is rendered for user perception.

In some embodiments, the method further includes determining that the point of focus includes the portion of the list of products comprising the at least one selectable product icon. At least one data structure that characterizes the device screen (e.g., size, shape, orientation) is retrieved from the device. The list of products is generated for display via the device screen based on the at least data structure. Eye tracking data corresponding to eyes of a user of the device is received from at least one eye tracking sensor communicatively coupled to the device. Based on the eye tracking data, an area of the screen that the user is looking at is determined. At the device, the area of the screen that the user is looking at is compared to a position of the at least one selectable product icon on the list of products. In response to determining, based on the comparing, that the area of the screen that the user is looking at includes the position of the at least one selectable product icon, the supplemental content is rendered for user perception.

In some embodiments, the method further comprises determining a location of the at least one secondary device relative to the device that generated the at least one selectable product icon for display. Supplemental content is then generated that comprises auxiliary audio based on the location of the at least one secondary device.

In some embodiments, the method further comprises generating an artificial intelligence generative prompt for generating supplemental content. The prompt is then transmitted an artificial intelligence generative engine, which generates the supplemental content. The supplemental content is transmitted to the at least one secondary device.

In some embodiment, the method further comprises retrieving device rendering capability data from the at least one secondary device. The device rendering capability data is compared to rendering criteria of the supplemental content. In response to determining the device rendering capability data satisfies the rendering criteria of the supplemental content, the supplemental content is transmitted to the at least on secondary device for rendering.

In some embodiments, the method further comprises retrieving device rendering capability data from the at least one secondary device. The device rendering capability data is compared to rendering criteria of the supplemental content. In response to determining the device rendering capability data fails to satisfy the rendering criteria of the supplemental content, an alternative secondary device is identified to transmit the supplemental content to for rendering.

In some embodiments, the method further comprises determining a location of the at least one secondary device relative to the device that generated the at least one selectable product icon for display. In some embodiments, the device may be determined to be moving relative to the at least one secondary device. Supplemental content is generated via the at least one secondary device when the device is determined to be within a same room as the at least one secondary device. In some embodiments, supplemental content comprises one or more of visual content or extended reality content. The supplemental content may be generated by an artificial intelligence generative engine based on content rendering capabilities of the at least one secondary device.

In some embodiments, the method further comprises receiving an input from the user corresponding to interaction with at least one of the selectable product icon or the supplemental content. Rendering criteria of the supplemental content is modified based on the input. The input may be a haptic feedback interaction with an extended reality element rendered from the supplemental content.

BRIEF DESCRIPTIONS OF THE DRAWINGS

The above and other objects and advantages of the disclosure may be apparent upon consideration of the following detailed description, taken in conjunction with the accompanying drawings, in which.

Figure 17:
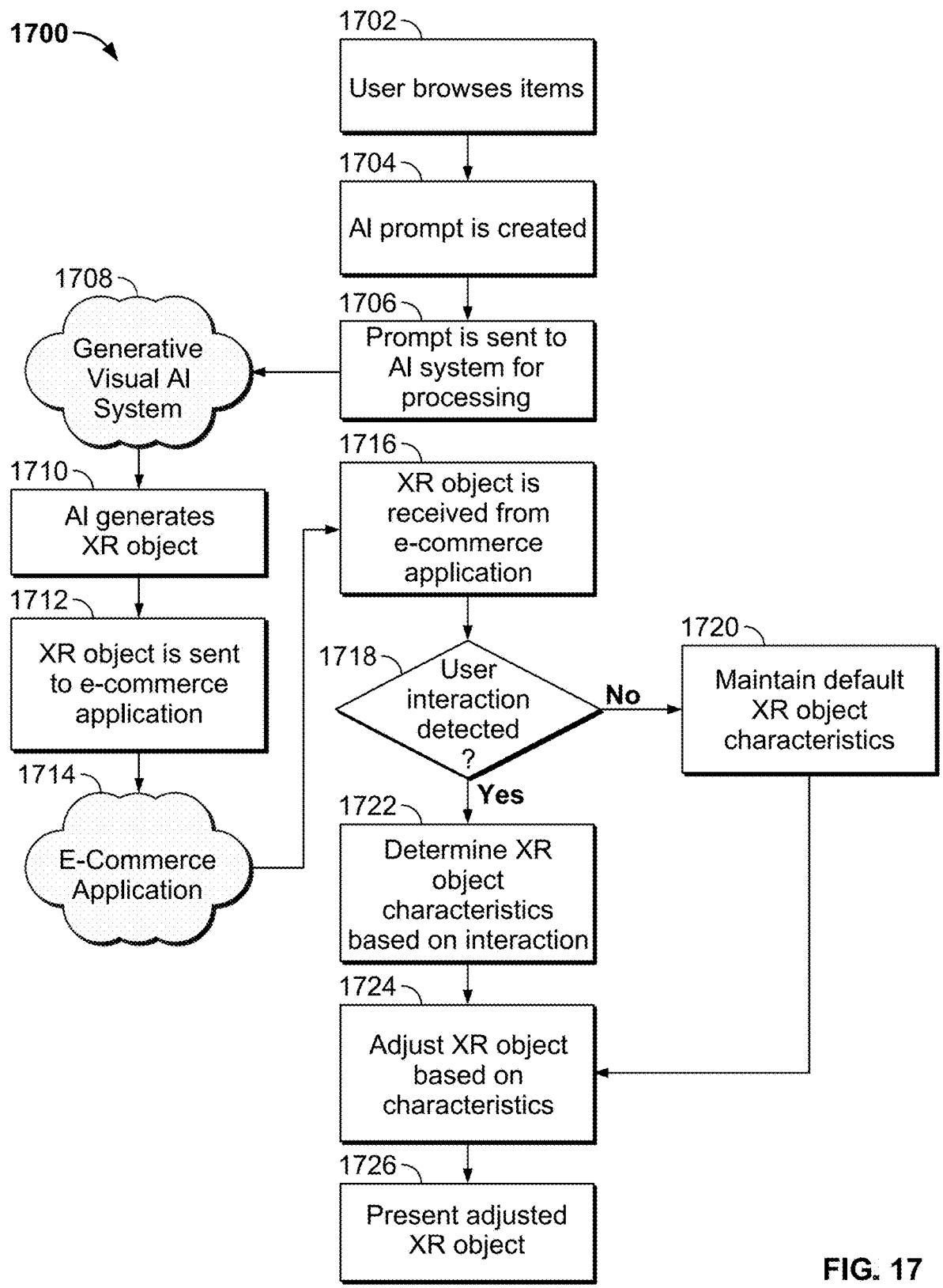
Figure 18:
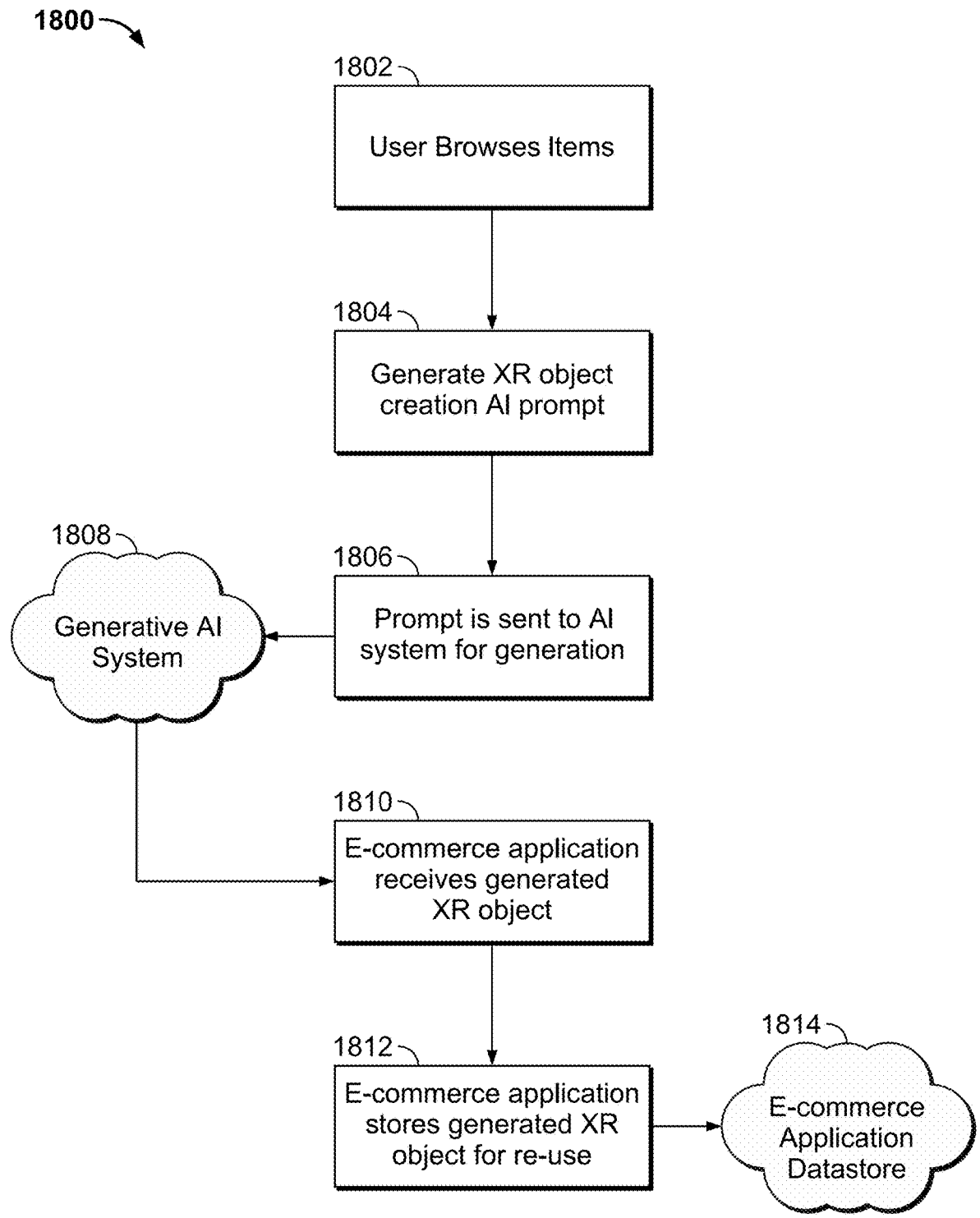

FIG. 17 is a block diagram of process 1700 for using a generative AI system to generate XR elements for user perception based on user interaction with an e-commerce application and user interaction with the generated XR elements, in accordance with some embodiments of the disclosure; and FIG. 18 is a block diagram of process 1800 for using a generative AI system to generate and store XR elements for an e-commerce application, in accordance with some embodiments of the disclosure.

DETAILED DESCRIPTION

Methods and systems are provided herein for detecting when a user is interacting with an e-commerce application on a first device (mobile device or Extended Reality, hereinafter "XR," headset), detecting the proximity or presence of one or more second devices capable of delivering spatial audio content, standard audio content, or light emission and delivering augmented spatial audio (e.g., when headphones which support spatial audio are utilized), Extended Reality Content (e.g., when utilizing an XR headset) and persistence of vision illumination (when using a device which is capable of emitting light). During a shopping or e-commerce experience, such as when using a mobile device or computer to search for and purchase products (e.g., an interactive application configured to allow a user to browse and purchase products on a mobile device), audio corresponding to the returned result set (e.g., based on contents of a search query) is processed by a spatial audio mixing apparatus or code module and presented to the user from one or more speakers incorporated into, or communicatively coupled to, one or more of a mobile device, computer or tablet, or other connected devices capable of playing audio (e.g., remote speakers, smart home assistants, or combinations thereof) and devices capable of presenting spatial audio (e.g., one or more of XR headsets or advanced audio output devices such as smart device compatible headphones). Additionally, the audio files and streams may be generated using a generative Artificial Intelligence model trained to create audio samples from a textual input or prompt.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory (RAM), etc.

Figure 1:
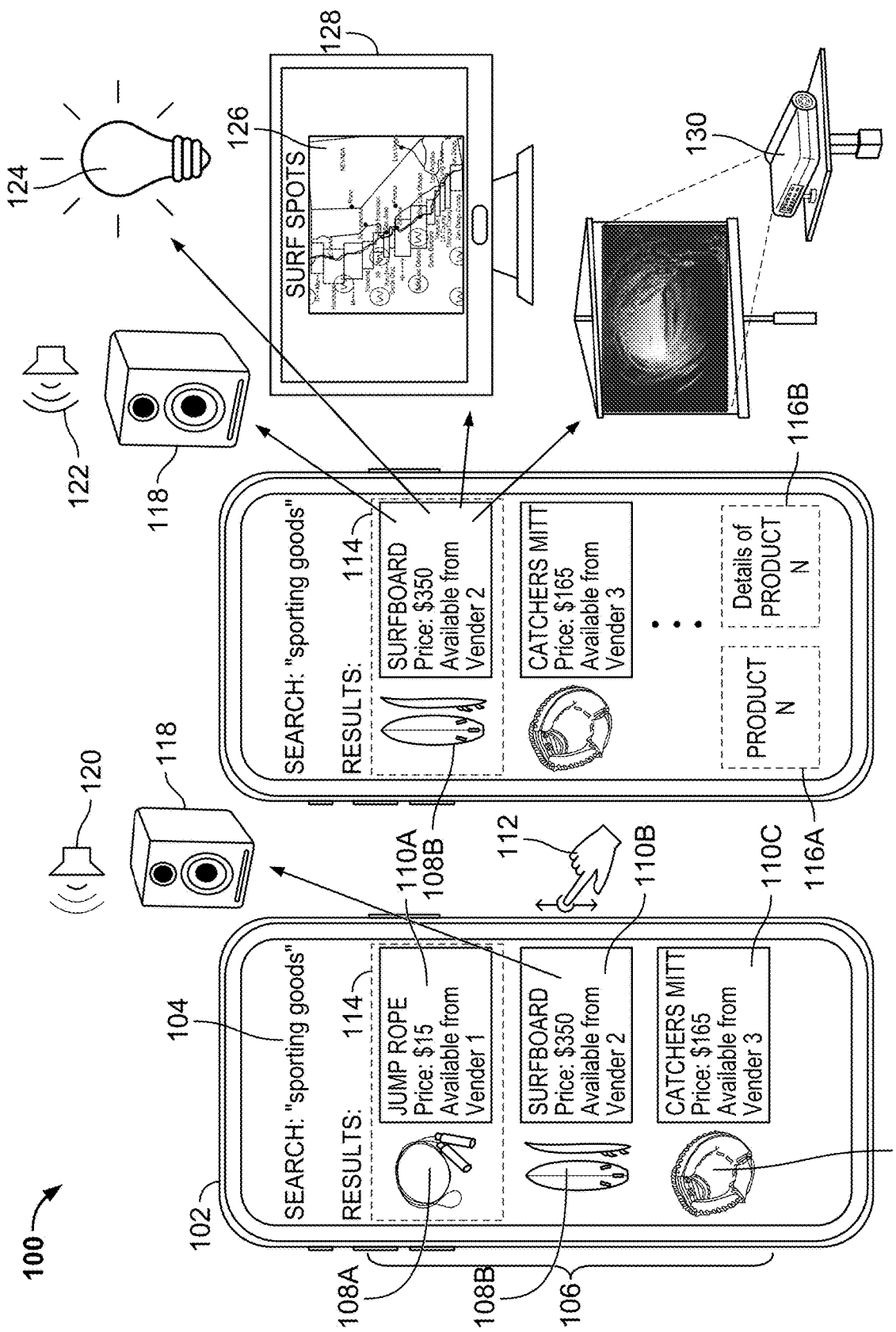
FIG. 1 depicts browsing scenario 100 where supplemental content corresponding to a product icon is generated for user perception, in accordance with some embodiments of the disclosure.

FIG. 1 depicts browsing scenario 100 where supplemental content corresponding to a product icon is generated for user perception, in accordance with some embodiments of the disclosure. Browsing scenario 100 may be facilitated by one or more of the devices or systems shown in FIGS. 2A and 2B. Additionally, or alternatively, browsing scenario 100 incorporates the execution of any or all of, in whole or in part, the methods depicted in and described in reference to FIGS. 3, 4 and 6-18.

Browsing scenario 100 comprises the use of an e-commerce interface or application on device 102. For example, a user may input search prompt 104 via device 102 to retrieve product list 106. Product list 106 includes selectable product icons 108A-C. Each of selectable product icons 106A-C are comprised of an image of a product the e-commerce application retrieved in response to receiving search prompt 104 as well as respective product information displays 110A-C. Each of product information displays 110A-C generate for display on a screen of device 102 a product name, a product price, and at least one vender from which the product can be purchased from. In some embodiments, one or more of selectable product icons 108A-C or production information displays 110A-C may be selectable by a user of device 102 in order to be directed to a more detailed product information page or to add a product corresponding to selectable product icons 108A-C or production information displays 110A-C to an e-commerce checkout interface where the user can order the product. In some embodiments, one or more of selectable product icons 108A-C or production information displays 110A-C may be markable through the e-commerce interface or application on device 102 so the user can either continue a search, revisit a product, or receive one or more advertisements of related products the user may be interested in. For example, where the e-commerce interface or application corresponds to a user profile, or device 102 loads interfaces based on a user profile, subsequent e-commerce related activities may be generated with personalized advertisements, recommendations, and supplemental content based on the active user profile during a particular e-commerce browsing or shopping session.

Once the e-commerce interface or application has generated product list 106 on a screen of device 102, a user is then able to interact with any of product list 106, selectable product icons 108A-C, or production information displays 110A-C. User interaction may include scrolling input 112, verbal instructions to modify or adjust the displayed icons, or may rely on eye tracking data of the user in order to identify where on the interface or screen of device 102 the user is focusing, reading, or has otherwise indicated interest. As shown in FIG. 1, user focus area 114 may be generated based on one or more of the positions of a particular selectable product icon (e.g., selectable product icon 108A) on product list 104 (e.g., at the top of the list), user eye tracking data indicating the user is interested or focused on a particular selectable product icon, or a user input that includes one or more of a verbal instruction to highlight a particular selectable product icon, a scrolling input to the screen of device 102, or a user selection of a particular selectable product icon. In some embodiments, the order of products displayed via product list 106 may be based on one or more of relevance criteria of each respective product to search prompt 104 (e.g., as determined by user profile data or e-commerce application criteria), a ranking or scoring of results based on user profile data (e.g., based on past e-commerce activity or other user preferences accessible via device 102), or a rating system from the e-commerce interface or application that corresponds to one or more of a product quality or a product popularity based on e-commerce data provided by other users (e.g., one or more of product units sold within a recent timeframe such as within the last month or product reviews generated via the e-commerce application from third party reviewers or consumers of the product via the e-commerce application).

Figure 2A:
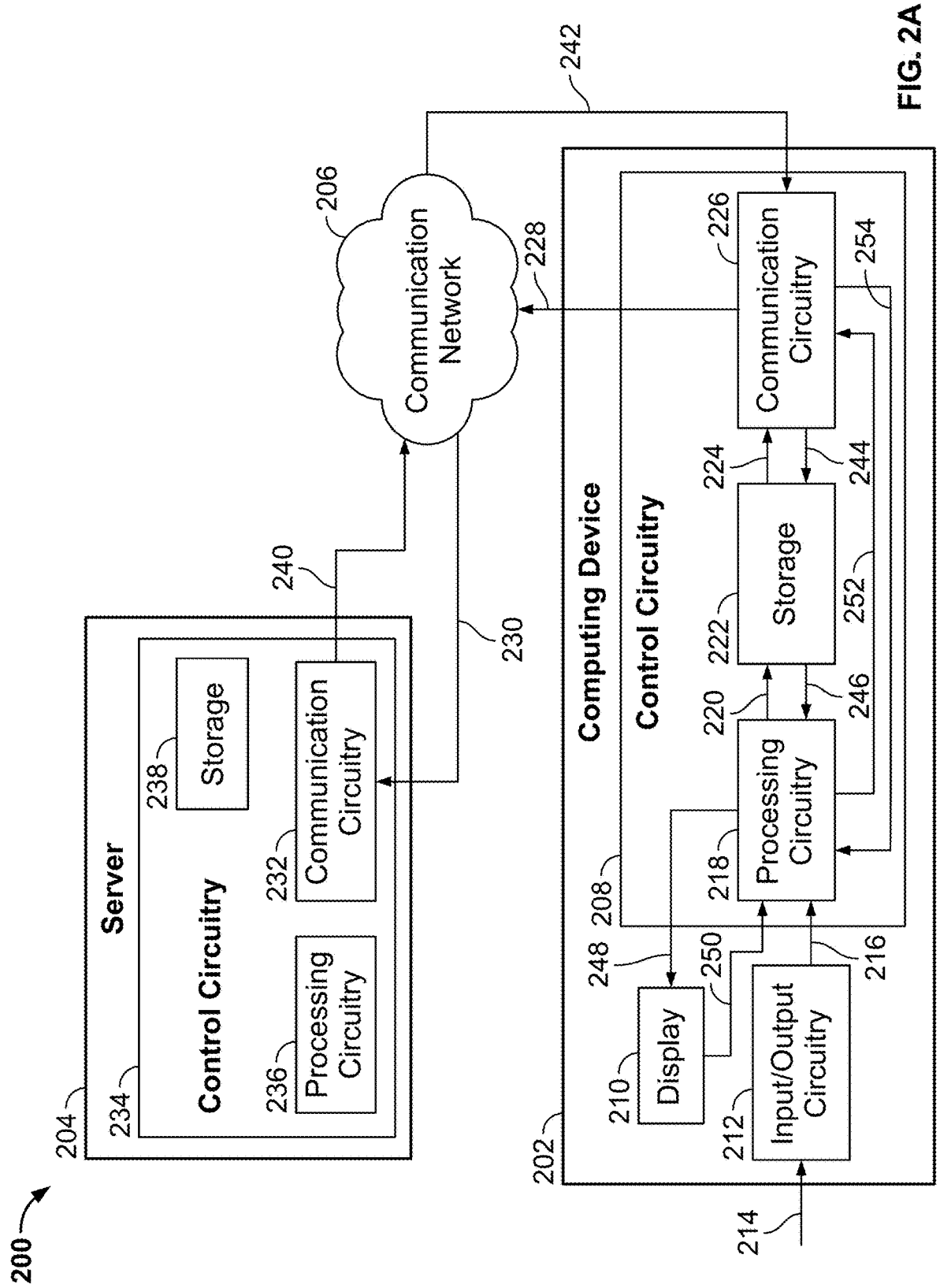
FIG. 2A depicts system 200 for processing requests for products based on a query and generating product icons with supplemental content for user perception, in accordance with some embodiments of the disclosure.

Each product on product list 106 corresponding to selectable product icons 108A-C and production information displays 110A-C may be associated with supplemental content that is accessible via the e-commerce application from a local or remote server communicatively accessible via device 102 (e.g., as shown in FIG. 2A). The server may store, search for, or otherwise access the supplemental content. In some embodiments, the supplemental content may be generated (e.g., using at least one generative artificial intelligence rendering engine) in response to user activity on device 102 with a particular selectable product icon. In some embodiments, the supplemental content is generated as product information is provided to the e-commerce application for dispersion to users in response to different product queries. Supplemental content may include one or more of passive or auxiliary sounds, songs, immersive sound affect patterns, activation of lights (e.g., light-emitting diodes, hereinafter LED lights) that are communicatively accessible via device 102, advertisements corresponding to product use, or generation of imagery related to one or more of product use, the product vender, or general scenic imagery considered related to a particular product.

Supplemental content may be generated for user perception in response to different conditions, as shown in browsing scenario 100. For example, as shown on the display of device 102, selectable product icon 108B is initially not within or highlighted by user focus area 114 whereas selectable product icon 108A is depicted as being within, or highlight by, user focus area 114. In view of the content of input search prompt 104 (e.g., "sporting goods"), and, in some embodiments, in view of user information or user profile data accessible via one or more of device 102 or the e-commerce application being browsed (e.g., user or device location data and user preferences or past purchase history with respect to "sporting goods"), product list 106 is ordered to display selectable product icons the user is expected to prefer before icons corresponding to products that do not align with either input search prompt 104 or the user data. As shown in FIG. 1, product list 106 shows a jump rope corresponding to selectable product icon 108A first then a surfboard corresponding to selectable product icon 108B. The jump rope, and therefore selectable product icon 108A, may be devoid of supplemental content, as shown in FIG. 1, while the surfboard, and therefore selectable product icon 108B, may correspond to one or more data structures that, when processed, result in the generation of one or more supplemental content elements for user perception. For example, the availability or accessibility of the supplemental content may be based on the available visual or audio output devices that are communicatively accessible or activatable via device 102.

The selection of output devices (e.g., one or more speakers, head mounted displays, headphones, LED light arrangements, secondary displays or screens of computers, smart televisions, or other devices, or projectors and other devices configured to render XR audio or visual content) may consist of first identifying components or elements of device 102 (e.g., integrated speakers or light arrangements) and then may identify if device 102 is communicatively coupled to one or more other devices capable of rendering supplemental content for user perception based on one or more of the user location or the location of device 102 relative to the one or more other devices. In some embodiments, where a user is connected to a smart home assistant device, device 102 may request information corresponding to one or more other devices based on the information available via the smart home assistant device as the smart home assistant device may already be communicatively coupled to the one or more other available devices capable of rendering supplemental content corresponding to a selectable product icon.

The system corresponding to device 102 and the one or more servers or datastores accessible via device 102 through an e-commerce application may determine the best combination of devices on which to present the supplemental content (e.g., audio and visual outputs). For example, if there are no speakers other than the ones incorporated into a mobile device, they may be the only speakers used. If it can be determined that there are one or more smart speakers present, they may be used or may be used in conjunction with the mobile device speakers. The same follows for headphones. In this way, a layered effect could be achieved where some sounds are emitted from a device speaker, others from headphones, others from smart speakers within the same room and others from smart speakers or devices in other rooms. Other considerations for device selection to render supplemental content include the type of user activity to cause the e-commerce application to generate product list 106 (e.g., providing voice inputs via a smart home assistant speaker to browse for items), availability of headphones (e.g., based on hardware connections or local network connections as well as indications of current or active user use of the headphones), or the incorporation of plurality of these devices during a particular product browsing session on an e-commerce application (e.g., if the devices are detected and activatable for at least supplemental content rendering).

In some embodiments, if a user is browsing the e-commerce application and searches for beach items, the returned result set may include items such as beach blankets, sand toys, swimsuits, and other related items. Some of the search results (e.g., products as displayed via product list 106) will be on-screen and others may be off screen (e.g., as represented via product Nicons 116A and 116B). A user using the invention may hear sounds associated one or more of the on-screen and off-screen items. In some embodiments, the off-screen items are of a much lower volume and may appear (e.g., as rendered when utilizing spatial audio processing) to be further away from the user. In this way, the user will have a rich and immersive experience. A similar approach is taken when presenting XR content to the user, XR items related to or representing the items returned by the search query may be presented in such a way that they indicate their position within product list 106. As shown in FIG. 1, speaker 118 has been identified as being accessible and communicatively coupled to device 102. Selectable product icon 108B comprises auxiliary sounds as supplemental content. In response to selectable product icon 108B as being close to user focus area 114 or as being displayed for user perception on a screen of device 102, the auxiliary sound begins playing from speaker 118 at auxiliary audio volume 120. Auxiliary audio volume 120 is then increased to primary audio volume 122 once selectable product icon 108B is determined to be the subject of the user's focus (e.g., based on eye tracking data or verbal inputs, or based on a determination that selectable product icon 108B is within user focus area 114). Additionally, or alternatively, the supplemental content may be changed from the auxiliary audio (e.g., a beach soundtrack of waves and other related sounds) to primary audio (e.g., a song the user may have indicated the user enjoys that inspires the user to purchase the product corresponding to selectable product icon 108B).

As depicted via scenario 100 of FIG. 1, supplemental content may comprise auxiliary audio (e.g., to be played by speaker 118 or other paired audio output device) for rendering when selectable product icon 108B is either near to the display screen of device 102 or on the display screen of device 102 without being within user focus area 114, or without being the subject of the user's focus based on one or more of user eye tracking data or user interaction with product list 106. Supplemental content may also comprise one or more of primary audio (e.g., to be played by speaker 118 or other paired audio output device at primary audio volume 122), instructions to activate LED display 124, auxiliary information 126 and activation instructions of secondary display 128, or immersive supplemental imagery 128 and activation instructions of XR content rendering device 130 (e.g., a projector or other form of a 2D or 3D image rendering engine). Where selectable product icon 108B is determined to be the subject of the user focus (e.g., being moved by user input, such as scrolling input 112, to user focus area 114 on the screen or display of device 102), one or more of these additional supplemental content items may be rendered for user perception based on the transmission of instructions from device 102, or a server communicatively coupled to device 102, to the processing circuitry of the respective devices selected for rendering individual or multiple elements of supplemental content.

While e-commerce and voice shopping are possible uses for the systems and methods of this disclosure (e.g., corresponding to browsing scenario 100), general voice queries can also benefit from the systems and methods of this disclosure. For example, a query to a smart home assistant device (e.g., "What is the weather like outside?") could result in playing a sound of wind if it is windy, a sound of birds chirping if it is sunny, sound of rain if it is raining, or other auxiliary or supplemental sounds to characterize current weather conditions. In another example, the sound of rain playing on a smart speaker close to the user with a thunderclap in another room indicating that there is a chance of a thunderstorm, where processing circuitry, corresponding to the smart home assistant device, determines based on data retrieved or received from a server that these sounds adequately or sufficiently characterize the current weather conditions to the user. Similarly, supplemental content can be presented in video format or as XR content. For example, if the smart speaker includes a display screen, then special screen effects can be presented (e.g., thunder, birds on a tree, or other familiar or related imagery, videos, or visual effects).

As another example of an alternative use of the systems and methods of this disclosure, a user of a device may provide a query such as "How's the DOW performing now?" In response to this query, the devices and systems of this disclosure may generate or access for playback play stock market sounds or even display colors (e.g., green or red via a smart speaker LED light). The LED light on any smart speaker may additionally, or alternatively, be utilized to communicate information. For example, in the previous example relating to a thunderclap, the LED light can also be used to communicate information (e.g., change colors by flashing in a warning manner based on the proximity of lightning strikes). Device or processing circuitry responses to queries, or generative AI requests for inputs to render or generate supplemental content, may comprise metadata that is utilized by the LED controller on the smart speaker to display a light or sequence of different light colors for a predetermined period of time. Metadata may also be used by any communicatively coupled and active device with a generative AI engine in order to create and render for user perception an immersive experience.

FIG. 2A depicts system 200 for processing requests for products based on a query and generating product icons with supplemental content for user perception, in accordance with some embodiments of the disclosure. System 200 may be configured to executed browsing scenario 100 of FIG. 1 (e.g., where device 102 of FIG. 1 is used as computing device 202 of FIGS. 2A and 2B) and may include various implementations of processing circuitry across one or more devices to execute any or all of, in whole or in part, the methods depicted in and described in reference to FIGS. 3, 4, and 6-18. System 200 is shown to include a computing device 202, a server 204 and a communication network 206. It is understood that while a single instance of a component may be shown and described relative to FIG. 2, additional instances of the component may be employed. For example, server 204 may include, or may be incorporated in, more than one server. Similarly, communication network 206 may include, or may be incorporated in, more than one communication network. Server 204 is shown communicatively coupled to computing device 202 through communication network 206. While not shown in FIG. 2, server 204 may be directly communicatively coupled to computing device 202, for example, in a system absent or bypassing communication network 206.

Communication network 206 may comprise one or more network systems, such as, without limitation, an internet, LAN, WIFI or other network systems suitable for audio processing applications. In some embodiments, system 200 excludes server 204, and functionality that would otherwise be implemented by server 204 is instead implemented by other components of system 200, such as one or more components of communication network 206. In still other embodiments, server 204 works in conjunction with one or more components of communication network 206 to implement certain functionality described herein in a distributed or cooperative manner. Similarly, in some embodiments, system 200 excludes computing device 202, and functionality that would otherwise be implemented by computing device 202 is instead implemented by other components of system 200, such as one or more components of communication network 206 or server 204 or a combination. In still other embodiments, computing device 202 works in conjunction with one or more components of communication network 206 or server 204 to implement certain functionality described herein in a distributed or cooperative manner.

Computing device 202 includes control circuitry 208, display 210 and input circuitry 212. Control circuitry 208 in turn includes communication circuitry 226, storage 222 and processing circuitry 218. In some embodiments, computing device 202 or control circuitry 208 may be configured as computing device 202 of FIG. 2B.

Server 204 includes control circuitry 234 and storage 238. Each of storages 222 and 238 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 222, 238 may be used to store various types of content, metadata, and or other types of data (e.g., they can be used to store user statistics or group statistics, difficult level values, user and plurality of user performance data or user performance metric, starting and endings of checkpoints, data relating to home automation devices and their settings and any user preferences, lists of recommendations and remedial actions, and ML, and AI algorithms). Non-volatile memory may also be used (e.g., to launch a boot-up routine and other instructions). Cloud-based storage may be used to supplement storages 222, 238 or instead of storages 222, 238. In some embodiments, data characterized through a user device, a profile affiliated with a user device, or data retrievable and transmittable to a generative AI engine, and data relating to all other processes and features described herein, may be recorded and stored in one or more of storages 222, 238.

In some embodiments, control circuitry 234 and/or 208 executes instructions for an application stored in memory (e.g., storage 238 and/or storage 222). Specifically, control circuitry 234 and/or 208 may be instructed by the application to perform the functions discussed herein. In some implementations, any action performed by control circuitry 234 and/or 208 may be based on instructions received from the application. For example, the application may be implemented as software or a set of executable instructions that may be stored in storage 238 and/or 222 and executed by control circuitry 234 and/or 208. In some embodiments, the application may be a client/server application where only a client application resides on computing device 202, and a server application resides on server 204.

The application may be implemented using any suitable architecture. For example, it may be a stand-alone application wholly implemented on computing device 202. In such an approach, instructions for the application are stored locally (e.g., in storage 222), and data for use by the application is downloaded on a periodic basis (e.g., from an out-of-band feed, from an internet resource, or using another suitable approach). Control circuitry 208 may retrieve instructions for the application from storage 222 and process the instructions to perform the functionality described herein. Based on the processed instructions, control circuitry 208 may determine a type of action to perform in response to input received from input circuitry 212 or from communication network 206. Other such processes are described at least in FIGS. 3, 4, and 6-18.

In client/server-based embodiments, control circuitry 208 may include communication circuitry suitable for communicating with an application server (e.g., server 204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 206). In another example of a client/server-based application, control circuitry 208 runs a web browser that interprets web pages provided by a remote server (e.g., server 204). For example, the remote server may store the instructions for the application in a storage device. The remote server may process the stored instructions using circuitry (e.g., control circuitry 208) and/or generate displays. Computing device 202 may receive the displays generated by the remote server and may display the content of the displays locally via display 210. This way, the processing of the instructions is performed remotely (e.g., by server 204) while the resulting displays, such as the display windows described elsewhere herein, are provided locally on computing device 202. Computing device 202 may receive inputs from the user via input circuitry 212 and transmit those inputs to the remote server for processing and generating the corresponding displays. Alternatively, computing device 202 may receive inputs from the user via input circuitry 212 and process and display the received inputs locally, by control circuitry 208 and display 210, respectively.

Server 204 and computing device 202 may transmit and receive content and data such as objects, frames, snippets of interest, and input from primary devices and secondary devices, such as speakers, LED displays or arrangements, monitors of smart home devices or audio-video device, or one or more of AR or XR devices. Control circuitry 234, 208 may send and receive commands, requests, and other suitable data through communication network 206. Control circuitry 234, 208 may communicate directly with each other using communication circuitry 226 and 232, respectively, avoiding communication network 206.

Figure 2B:
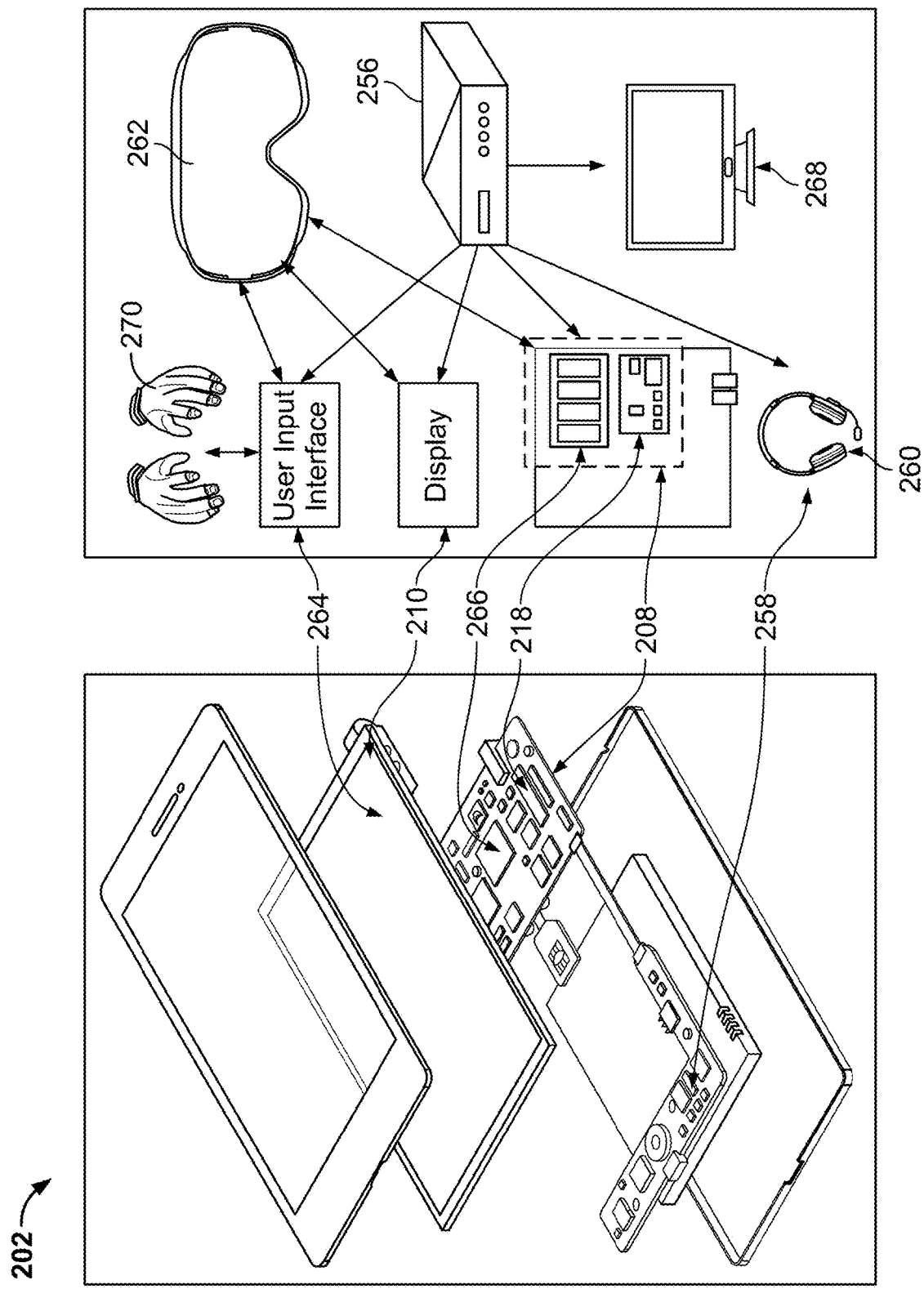
FIG. 2B depicts computing device 202 of system 200, in accordance with some embodiments of the disclosure.

It is understood that computing device 202 is not limited to the embodiments and methods shown and described herein. In nonlimiting examples, computing device 202 may be a virtual, augmented, or mixed reality headset, smart glasses, or a device that can perform function in the metaverse (e.g., as shown in FIGS. 1 and 2B), a primary device, a personal computer (PC), a laptop computer, a tablet computer, a WebTV box, a personal computer television (PC/TV), a PC media server, a PC media center, a handheld computer, a mobile telephone, a smartphone, or any other device, computing equipment, or wireless device, and/or combination of the same capable of suitably displaying primary content and secondary content.

Control circuitry 234 and/or 208 may be based on any suitable processing circuitry such as processing circuitry 218 and/or 236, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 234 and/or control circuitry 208 are configured to render one or more elements of supplemental content corresponding to a selectable product icon described throughout this disclosure (e.g., audio content, visible content, XR immersive content).

User input 204 may be received from virtual, augmented, or mixed reality headsets, mobile data, smart glasses. Transmission of user input 204 to computing device 202 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, 5G, or any other suitable wireless transmission protocol. Input circuitry 212 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, 5G, or other wireless transmission protocols.

Processing circuitry 218 may receive input 204 from input circuit 212. Processing circuitry 218 may convert or translate the received user input 204 that may be in the form of voice input into a microphone, or movement or gestures to digital signals. In some embodiments, input circuit 212 performs the translation to digital signals. In some embodiments, processing circuitry 218 (or processing circuitry 236, as the case may be) carries out disclosed processes and methods. For example, processing circuitry 218 or processing circuitry 236 may perform processes as described in reference to FIGS. 3, 4, and 6-18.

FIG. 2B depicts computing device 202 of system 200, in accordance with some embodiments of the disclosure. Computing device 202 may be configured to executed browsing scenario 100 of FIG. 1 (e.g., where device 102 of FIG. 1 is used as computing device 202 of FIGS. 2A and 2B) and may include various implementations of processing circuitry across one or more devices to execute any or all of, in whole or in part, the methods depicted in and described in reference to FIGS. 3, 4, and 6-18.

Computing device 202 may be a smartphone device, a tablet, a virtual reality or augmented reality device, or any other suitable device capable of processing data corresponding to an e-commerce application and related supplemental content described in this disclosure. In another example, a user equipment device, such as a user television equipment system or streaming interface device, may include media access device 256. Media access device 256 may be communicatively connected to haptic enabled headset 258, audio input equipment (e.g., headset microphone 260), and display 210. In some embodiments, display 210 may be a television display or a computer display. In some embodiments, display 210 may be a display in an HMD or an XR device. As shown in FIG. 2B, display 210 may be communicatively coupled to or may comprise head mounted display 262, which also is shown in FIG. 2B as being communicatively coupled to one or more of user input interface 264 (e.g., may display user input interface 264 with capabilities to receive user inputs via input/output circuitry 212 of FIG. 2A) or haptic feedback hand devices 270 (e.g., configured to enable a user to provide inputs to user input interface 268 or display 210 as the user would by a remote or a communicatively coupled computer mouse or joystick), while also being communicatively coupled to media access device 256. In some embodiments, user input interface 268 may be a remote-control device. Media access device 256 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of computing device 202 and user equipment device 801 may receive content and data via input/output (I/O) path (e.g., circuitry) 266, which may communicatively interface with head mounted display 262. I/O path 266 may provide content (e.g., broadcast programming, on-demand programming, Internet content, content available over a local area network (LAN) or wide area network (WAN), and/or other content) and data to control circuitry 208, which may comprise processing circuitry 218 and storage 222 of FIG. 2A. Control circuitry 208 may be used to send and receive commands, requests, and other suitable data using I/O path 266, which may comprise I/O circuitry. I/O path 266 may connect control circuitry 208 (and specifically processing circuitry 218) to one or more communications paths (described below). I/O functions may be provided by one or more of these communications paths, but are shown as a single path in FIG. 2B to avoid overcomplicating the drawing. While media access device 256 is shown in FIG. 2B for illustration, any suitable computing device having processing circuitry, control circuitry, and storage may be used in accordance with the present disclosure. For example, media access device 256 may be replaced by, or complemented by, a personal computer (e.g., a notebook, a laptop, a desktop), a smartphone (e.g., device 202), a tablet, a network-based server hosting a user-accessible client device, a non-user-owned device, any other suitable device, or any combination thereof.

Control circuitry 208 may be based on any suitable control circuitry such as processing circuitry 218. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 208 executes instructions for the immersive video application stored in memory (e.g., storage 222 or 238 of FIG. 2A). Specifically, control circuitry 208 may be instructed by the immersive video application to perform the functions discussed above and below. In some implementations, processing or actions performed by control circuitry 208 may be based on instructions received from the immersive video application.

In client/server-based embodiments, control circuitry 208 may include communications circuitry suitable for communicating with a server or other networks or servers. The immersive video application may be a stand-alone application implemented on a device or a server. The immersive video application may be implemented as software or a set of executable instructions. The instructions for performing any of the embodiments discussed herein of the immersive video application may be encoded on non-transitory computer-readable media (e.g., a hard drive, random-access memory on a DRAM integrated circuit, read-only memory on a BLU-RAY disk, etc.). For example, in FIG. 2B, the instructions may be executed by control circuitry 208 of computing device 202 while being stored via one or more processors shown in FIG. 2A.

In some embodiments, the immersive video application may be a client/server application where only the client application resides on computing device 202, and a server application resides on an external server (e.g., server 204 of FIG. 2A). For example, the immersive video application may be implemented partially as a client application on control circuitry 208 of computing device 202 and partially on server 204 as a server application running on control circuitry 234. Server 204 may be a part of a local area network with one or more computing devices 202 or may be part of a cloud computing environment accessed via the internet. In a cloud computing environment, various types of computing services for performing searches on the internet or informational databases, providing seamless virtual space traversing capabilities, providing storage (e.g., for a database) or parsing data (e.g., using machine learning algorithms) are provided by a collection of network-accessible computing and storage resources (e.g., server 204 and multiples of computing device 202), referred to as "the cloud." Computing device 202 may be a cloud client that relies on the cloud computing capabilities from server 204 to determine whether processing (e.g., at least a portion of virtual background processing and/or at least a portion of other processing tasks) should be offloaded from the mobile device, and facilitate such offloading. When executed by control circuitry of server 204, the immersive video application may instruct control circuitry 234 or 208 to perform processing tasks for the client device and facilitate the seamless virtual space traversing.

Control circuitry 208 may include communications circuitry suitable for communicating with a server, edge computing systems and devices, a table or database server, or other networks or servers. The instructions for carrying out the above mentioned functionality may be stored on a server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths. In addition, communications circuitry may include circuitry that enables peer-to-peer communication of user equipment devices, or communication of user equipment devices in locations remote from each other (described in more detail below).

Memory may be an electronic storage device that is part of control circuitry 208. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. The storage may be used to store various types of content described herein as well as immersive video application data described above. Nonvolatile memory may also be used (e.g., to launch a boot-up routine and other instructions). Cloud-based storage may also be used to supplement storage 238 of FIG. 2A or instead of storage 222.

Control circuitry 208 may include video generating circuitry and tuning circuitry, such as one or more analog tuners, one or more video decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 208 may also include scaler circuitry for up converting and down converting content into the preferred output format of computing device 202. Control circuitry 208 may also include digital-to-analog converter circuitry and analog-to-digital converter circuitry for converting between digital and analog signals. The tuning and encoding circuitry may be used by computing device 202 to receive and to display, to play, or to record content. The tuning and encoding circuitry may also be used to receive video data for seamless interspace traversing. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage is provided as a separate device from computing device 202, the tuning and encoding circuitry (including multiple tuners) may be associated with the storage.

Control circuitry 208 may receive instruction from a user by way of user input interface 264. User input interface 264 may be any suitable user interface, such as a remote control, mouse, trackball, keypad, keyboard, touch screen, touchpad, stylus input, joystick, voice recognition interface, or other user input interfaces (e.g., an interface configured to receive inputs from haptic feedback hand devices 270). Display 210 may be provided as a stand-alone device or integrated with other elements of each one of computing device 202. For example, display 210 may be a touchscreen or touch-sensitive display. In such circumstances, user input interface 264 may be integrated with or combined with display 210 (e.g., where haptic feedback hand devices 270 is configured to enable a user to interact with or manipulate aspects of a media asset interface displayed via head mounted display 262). In some embodiments, user input interface 264 includes a remote-control device having one or more microphones, buttons, keypads, and any other components configured to receive user input or combinations thereof. For example, user input interface 264 may include a handheld remote-control device having an alphanumeric keypad and option buttons (e.g., haptic feedback hand devices 270). In a further example, user input interface 264 may include a handheld remote-control device having a microphone and control circuitry configured to receive and identify voice commands and transmit information to media access device 256.

Headset microphone 260 may be integrated with or combined with display 210. Display 210 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 210. Headset microphone 260 may be provided as integrated with other elements of each one of computing device 202 or may be stand-alone units. An audio component of videos and other content displayed on display 210 may be played through speakers (or headphones) of haptic enabled headset 258. In some embodiments, audio may be distributed to a receiver (not shown), which processes and outputs the audio via speakers of haptic enabled headset 258. In some embodiments, for example, control circuitry 208 is configured to provide audio cues to a user, or other audio feedback to a user, using speakers of haptic enabled headset 258. There may be a separate haptic enabled headset 258 or headset microphone 260 may include a microphone configured to receive audio input such as voice commands or speech. For example, a user may speak letters or words that are received by the microphone and converted to text by control circuitry 208. In a further example, a user may voice commands that are received by a microphone and recognized by control circuitry 208. Recording device 268 may be any suitable video camera integrated with the equipment or externally connected. Recording device 268 may be a digital camera comprising a charge-coupled device (CCD) and/or a complementary metal-oxide semiconductor (CMOS) image sensor. Recording device 268 may be an analog camera that converts to digital images via a video card.

An application configured to provide a user access to an e-commerce platform and also provide rendering instructions for supplemental content to secondary subsystems, systems, or devices, or one communicatively coupled to a generative AI engine for generating supplemental content, may be implemented using any suitable architecture. For example, it may be a stand-alone application wholly implemented on each one of computing device 202. In such an approach, instructions of the application may be stored locally, and data for use by the application is downloaded on a periodic basis (e.g., from an out-of-band feed, from an Internet resource, or using another suitable approach). Control circuitry 208 may retrieve instructions of the application from storage and process the instructions to provide seamless interspace traversing functionality and perform any of the actions discussed herein. Based on the processed instructions, control circuitry 208 may determine what action to perform when input is received from user input interface 264. For example, movement of a cursor on a display up/down may be indicated by the processed instructions when user input interface 264 indicates that an up/down button was selected (e.g., based on inputs provided via haptic feedback hand devices 270). An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the application is a client/server-based application. Data for use by a thick or thin client implemented on each one of computing device 202 and may be retrieved on-demand by issuing requests to a server remote to each one of computing device 202. For example, the remote server may store the instructions for the application in a storage device. The remote server may process the stored instructions using circuitry (e.g., control circuitry 208) and generate the displays discussed above and below. The client device may receive the displays generated by the remote server and may display the content of the displays locally on computing device 202. This way, the processing of the instructions is performed remotely by the server while the resulting displays (e.g., that may include text, a keyboard, or other visuals) are provided locally on computing device 202. Computing device 202 may receive inputs from the user via input interface 264 and transmit those inputs to the remote server for processing and generating the corresponding displays. For example, computing device 202 may transmit a communication to the remote server indicating that an up/down button was selected via input interface 264 (e.g., based on one or more inputs provided via one or more of haptic feedback hand devices 270 or head mounted display 262). The remote server may process instructions in accordance with that input and generate a display of the application corresponding to the input (e.g., a display that moves a cursor up/down). The generated display is then transmitted to a communicatively accessible device for presentation to the user.

In some embodiments, the immersive video application may be downloaded and interpreted or otherwise run by an interpreter or virtual machine (run by control circuitry 208). In some embodiments, the immersive video application may be encoded in the ETV Binary Interchange Format (EBIF), received by control circuitry 208 as part of a suitable feed, and interpreted by a user agent running on control circuitry 208. For example, the immersive video application may be an EBIF application. In some embodiments, the immersive video application may be defined by a series of JAVA-based files that are received and run by a local virtual machine or other suitable middleware executed by control circuitry 208. In some of such embodiments (e.g., those employing MPEG-2 or other digital media encoding schemes), immersive video application may be, for example, encoded and transmitted in an MPEG-2 object carousel with the MPEG audio and video packets of a program.

Figure 3:
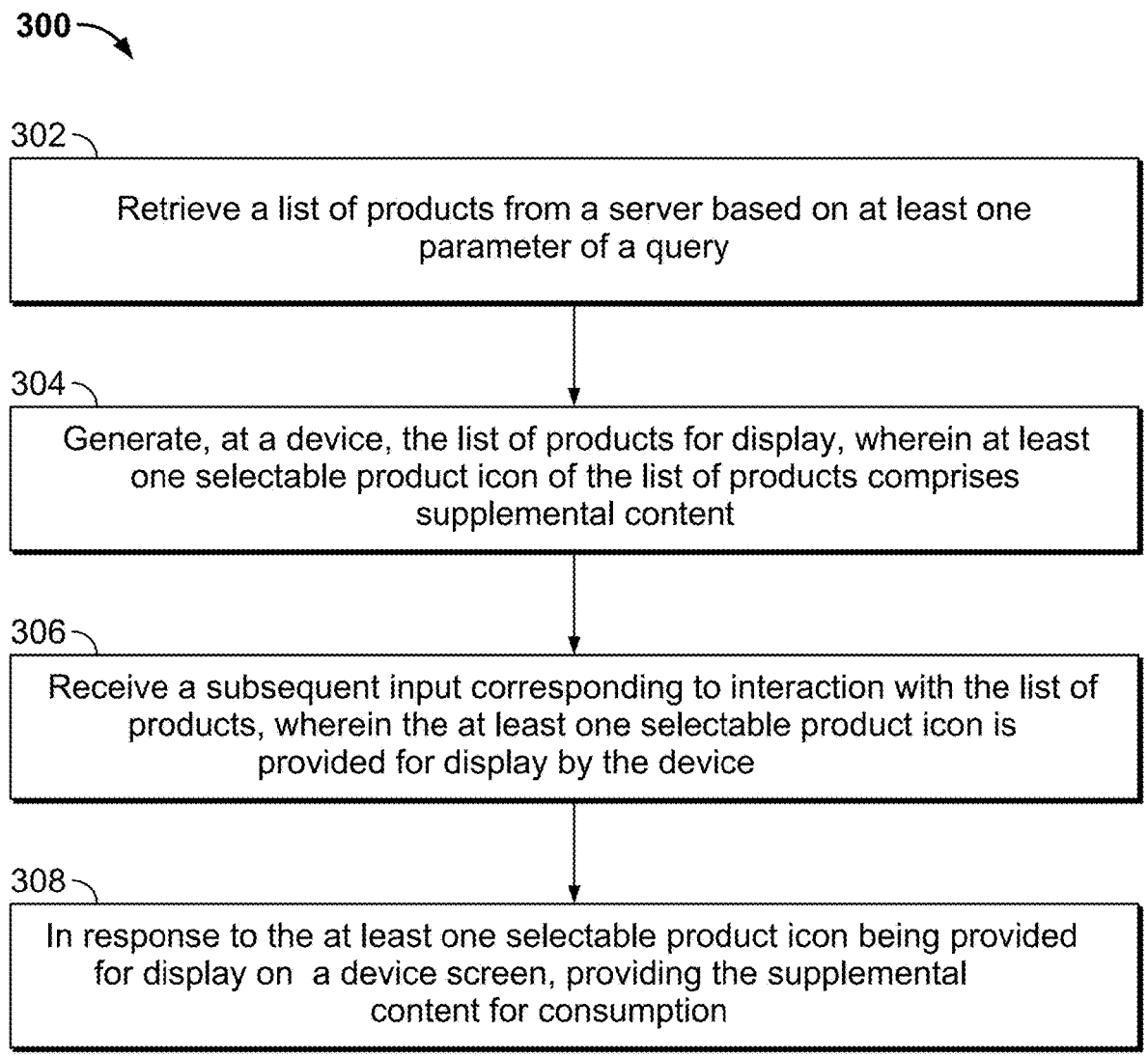
FIG. 3 is a block diagram of process 300 for rendering supplemental content corresponding to a product icon for user perception based on user browsing activity, in accordance with some embodiments of the disclosure.

FIG. 3 is a block diagram of process 300 for rendering supplemental content corresponding to a product icon for user perception based on user browsing activity, in accordance with some embodiments of the disclosure. Process 300 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

At process block 302, a list of products is retrieved from a server based on at least one parameter of a query. For example, the parameter or parameters of the query may include one or more of at least one character, at least one descriptive element, or at least one product characterization. At process block 304, the list of products is generated for display at a device and at least one selectable product icon of the list of products comprises supplemental content (e.g., audio or visual content to be rendered for user perception by one or more devices described in this disclosure). At process block 306, a subsequent input corresponding to interaction with the list of products (e.g., a scrolling input or eye tracking data is collected and processed to determine a user's focus is directed to a particular element of the list of products) is received and the at least one selectable product icon provided for display by the device (e.g., rendered by processing circuitry for viewing and selection by a user). For example, the at least one selectable product icon may be positioned on the product list such that it is not currently displayed and becomes displayed in response to a user scrolling input. At process block 308, the supplemental content provided for consumption (e.g., one or more of visibly or audibly for the user to perceive the icon) in response to the at least one selectable product icon being provided for display on a device screen. For example, audio corresponding to the selectable product icon may begin playing once the icon is viewable on the device screen by the user.

Figure 4:
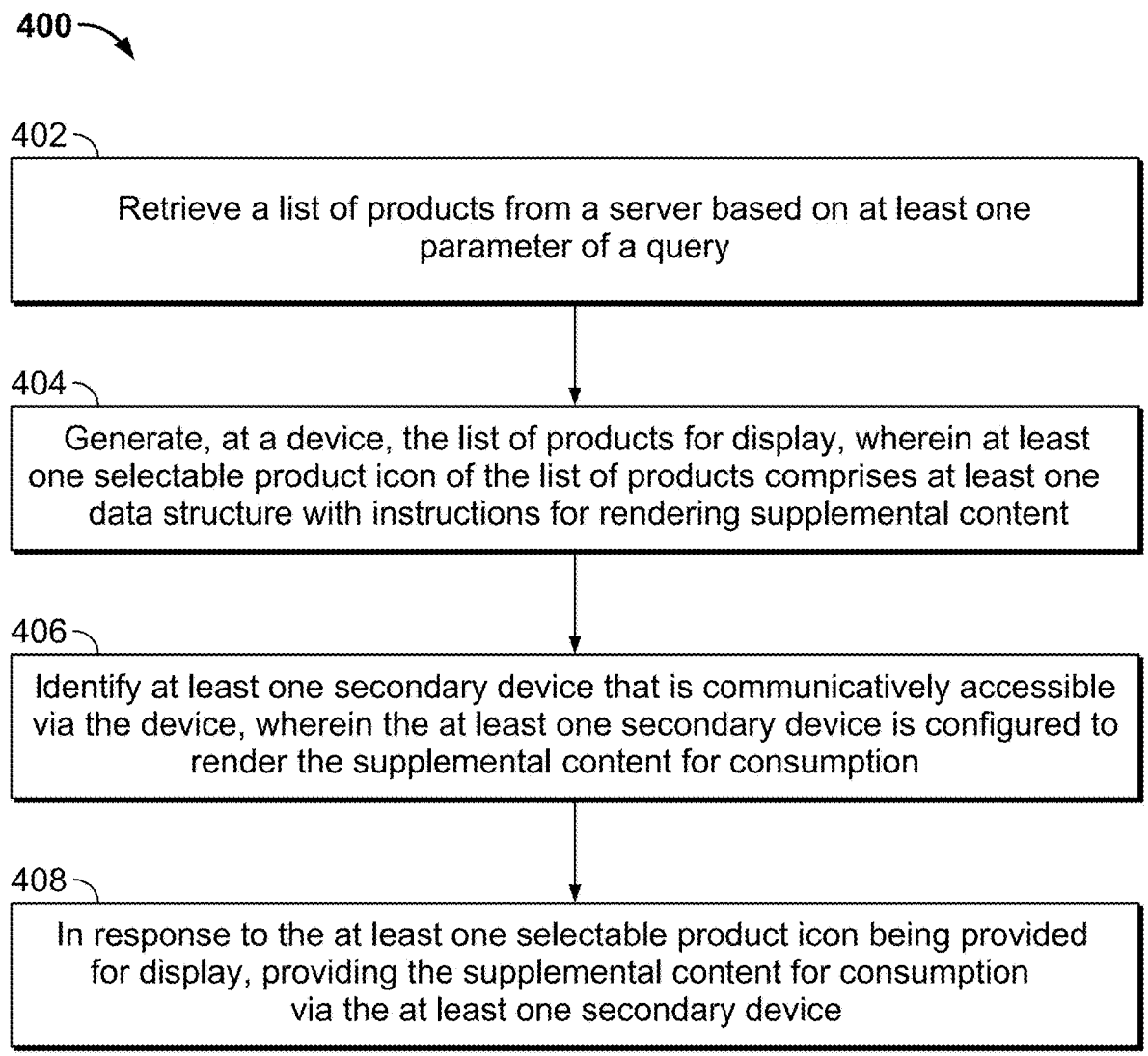
FIG. 4 is a block diagram of process 400 for rendering supplemental content corresponding to a product icon for user perception causing the user to have an immersive experience, in accordance with some embodiments of the disclosure.

FIG. 4 is a block diagram of process 400 for rendering supplemental content corresponding to a product icon for user perception causing the user to have an immersive experience, in accordance with some embodiments of the disclosure. Process 400 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

At process block 402, a list of products is retrieved from a server based on at least one parameter of a query. For example, the parameter or parameters of the query may include one or more of at least one character, at least one descriptive element, or at least one product characterization. At process block 404, the list of products is generated for display at a device and at least one selectable product icon of the list of products comprises at least one data structure with instructions for rendering supplemental content (e.g., one or more of audio or visual content to be rendered for user perception by one or more devices described in this disclosure in order to create an immersive e-commerce shopping experience which may include AR or XR content for the user to interact with and perceive). At process block 406, at least one secondary device that is communicatively accessible via the device (e.g., may be in communication with the device by a local or other network or may be activatable for receiving supplemental content rendering criteria based on instructions transmitted via the device, an application, or a server connected thereto) is identified and the at least one secondary device is configured to render the supplemental content for consumption based at least in part on the content discernable from the at least one data structure. At process block 408, the supplemental content is provided for consumption via the at least one secondary device in response to the at least one selectable product icon being provided for display. For example, audio and visual outputs corresponding to the selectable product icon may be rendered for user perception and interaction once the icon is viewable on the device screen by the user.

Figure 5:
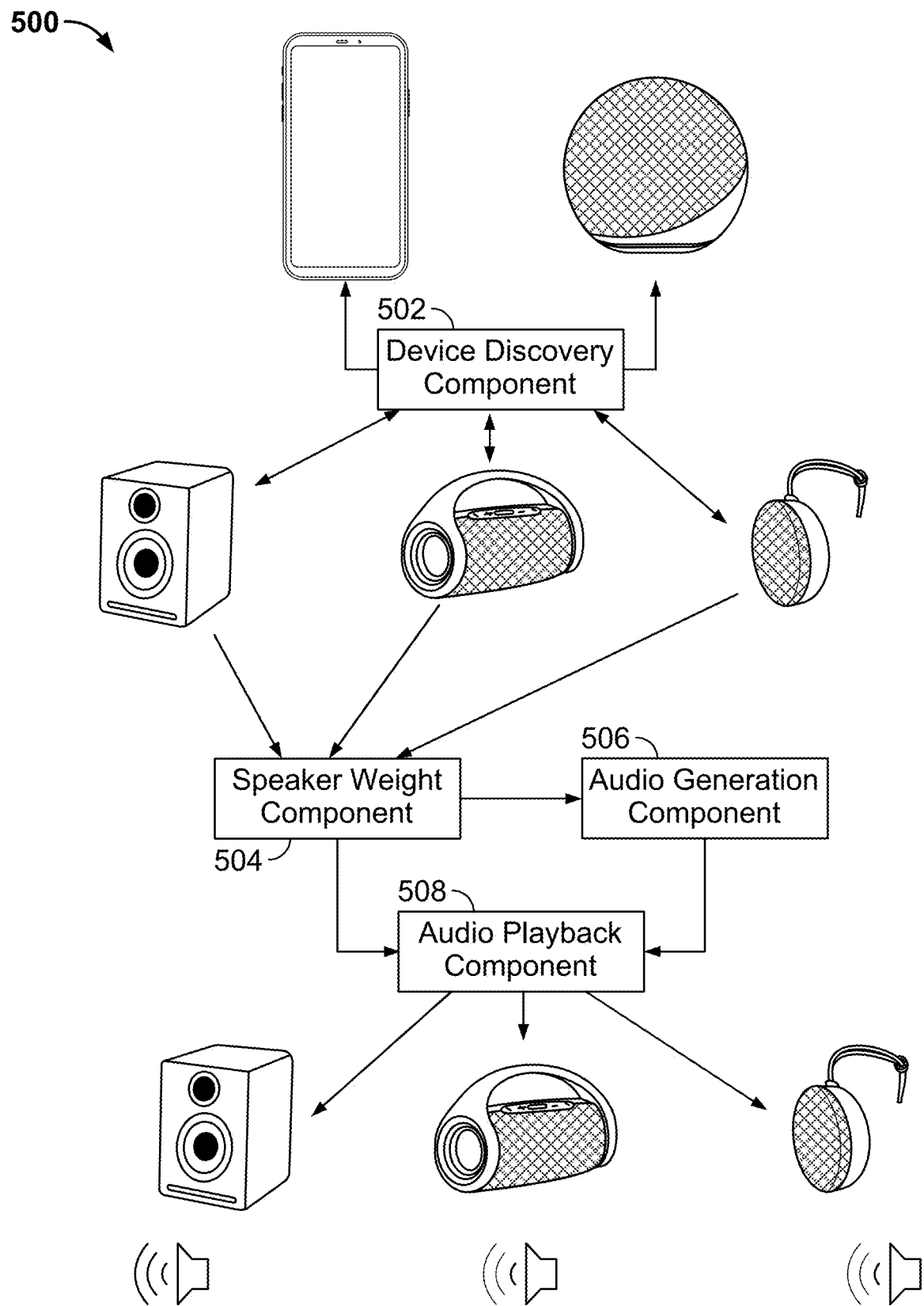
FIG. 5 depicts system 500 for rendering an immersive experience for a user based on available devices and the user browsing activity, in accordance with some embodiments of the disclosure.

FIG. 5 depicts system 500 for rendering an immersive experience for a user based on available devices and the user browsing activity, in accordance with some embodiments of the disclosure. For example, system 500 may be configured as shown in FIG. 5 to identify and communicate with multiple audio devices. In some embodiments, system 500 may incorporate one or more devices capable of rendering visual content (e.g., one or more of images, video, LED displays, or supplemental information corresponding to one or more products or user profile data). System 500 may be configured to executed browsing scenario 100 of FIG. 1 (e.g., where device 102 of FIG. 1 is used as device discover component 502 of FIG. 5) and may include various implementations of processing circuitry across one or more devices to execute any or all of, in whole or in part, the methods depicted in and described in reference to FIGS. 3, 4, and 6-18. It is understood that while a single instance of a component may be shown and described relative to FIG. 5, additional instances of the component may be employed. For example, audio generation component 506 may include, or may be incorporated in, more than one generative AI engine that is also configured for visual output generation (e.g., for projectors, LED displays, or other types of visual outputs to be rendered on a monitor or screen). Similarly, the arrows shown in FIG. 5 represent communication streams between one or more devices or processing circuitries and may include, or may be incorporated in, one or communication networks.

System 500 is comprised of device discovery component 502, speaker weight component 504, audio generation component 506, and audio playback component 508. Device discovery component 502 may comprise one or more devices or processing circuitries configured to detect one or more communicatively accessible devices (e.g., devices that can be activated from device discovery component and devices that can render the supplemental content of this disclosure for user perception). For example, where device discovery component 502 is a personal or smart device such as computing device 202 of FIGS. 2A and 2B, then device discovery component 502 may utilized a Bluetooth type of local communication to identify one or more speakers that can be paired with device discovery component 502 and other components of system 500. In another example, device discovery component 502 may be a smart home assistant device configured to activate and transmit rendering instructions to one or more devices based on a user sourced prompt (e.g., user profile settings, user verbal instructions, or other user sourced inputs). Additionally, or alternatively, device discovery component 502 may comprise a personal or mobile smart device communicatively coupled to a smart home assistant device such that the methods of this disclosure may be executed based on inputs received at either or both devices.

In response to device discovery component 502 identifying one or more speakers, as shown in FIG. 5, speaker weight component 504 computes and applies a weight to each identified speaker to generate criteria for processing circuitry (e.g., of one or more devices described in reference to the systems of this disclosure) to identify which devices to transmit instructions to render supplemental audio content. For example, where three speakers are identified as shown in FIG. 5, a user who provided a request for a product list may only be in a same room as one speaker while the other two speakers are in adjacent rooms of a same building in which the room with the one speaker is arranged. As a result, the speaker in the same room may be assigned a higher priority or weight and may be selected as a primary rendering device for supplemental content that results in an audio output. In some embodiments, speaker weight component 504 may be incorporated into system 500 with one or more visual or XR output weight components where supplemental content corresponding to at least one product of a product list comprises visual or XR outputs.

In response to speaker weight component 504 completing an assignment of weights to detected output devices, one or more of audio generation component 506 or audio playback component 508 may be activated. For example, where the device or devices identified as being active and suitable for rendering supplemental content are compatible with readily available supplemental content files and corresponding rendering instructions, then the content files and corresponding rendering instructions are transmitted to audio playback component 508 (e.g., processing circuitry of one or more detected speakers selected for rendering audio output). In another example, supplemental content may not be readily available to transmit and render. As a result, audio generation component 506 is activated to either modify existing content to make the content compatible and able to be rendered by the device or devices with a high enough weight assigned for rendering the content. In some embodiments, audio generation component 506 comprises at least one audio generative AI engine configured to render supplemental content based on at least one prompt that is generated based on at least one user input (e.g., a query for a list of products). Additionally, or alternatively, audio generation component 506 may include or interface with video or XR generative AI engines configured for generating compatible or original supplemental content for rendering at detected devices. Once the generated content is available for transmission, the content is transmitted to audio playback component 508 or a corresponding video or XR rendering device for generation for user perception.

System 500 may be configured to create XR content using generative AI engines based on the results returned by a query within an e-commerce application and considering the user browsing experience (e.g., user scrolling speed or user eye tracking data) and the user's spatially mapped environment. In some embodiments, system 500 may be configured to store storing AI generated audio, AI generated video, AI generated imagery, and AI generative XR content for re-use within the e-commerce application or system. System 500 may also be configured to establish one or more of a transitory or semi-permanent connection from a first device to a second device (e.g., using a localized Bluetooth connection) when a user launches a particular application such as an e-commerce application. For example, the connection can be between a mobile device and one or more smart speakers in the vicinity. In this way, spatial audio could be emulated for both standard notifications as well as e-commerce shopping.

In some embodiments, system 500 may be configured to interface with multiple smart speakers to create the allusion of a package arriving (e.g., play delivery sound softly in another room, play delivery sound louder in another room, play delivery sound softly in same room as user, play delivery sound louder in same room as user, play delivery sound on user's mobile device). Enabling, disabling, or tailoring the connection and experience based on a user profile within an e-commerce application is an integral part of the operations of system 500 in order to personalize the immersive experience for the user. For example, where the Bluetooth pairing persistent data is stored on a user profile accessible from a plurality of devices and enabled or disabled on a per application basis, the user's home and related devices are thereby enabled by system 500 to create an immersive home shopping experience for the user.

In some embodiments, system 500 is also configured to determining which audio output devices (e.g., smart speakers, headphones, mobile phone speakers) are connected or are in proximity to determine the extent of the spatial audio and emulated spatial audio should be rendered for user perception. For example, one or more components of system 500 may detect that a user is wearing one or more of headphones capable of playing spatial audio or XR headset speakers. Additionally, or alternatively, system 500 may be configured to detect the presence and proximity of one or more smart speakers or a combination of both in order to create an immersive or customized audio experience for a user of system 500. For example, the system may primarily or only use the headphones, or the system may primarily or only use smart speakers. In some embodiments, where one or more devices are detected, system 500 may be configured to use a combination of paired devices to create layers of audio to enhance the shopping experience.

Figure 6:
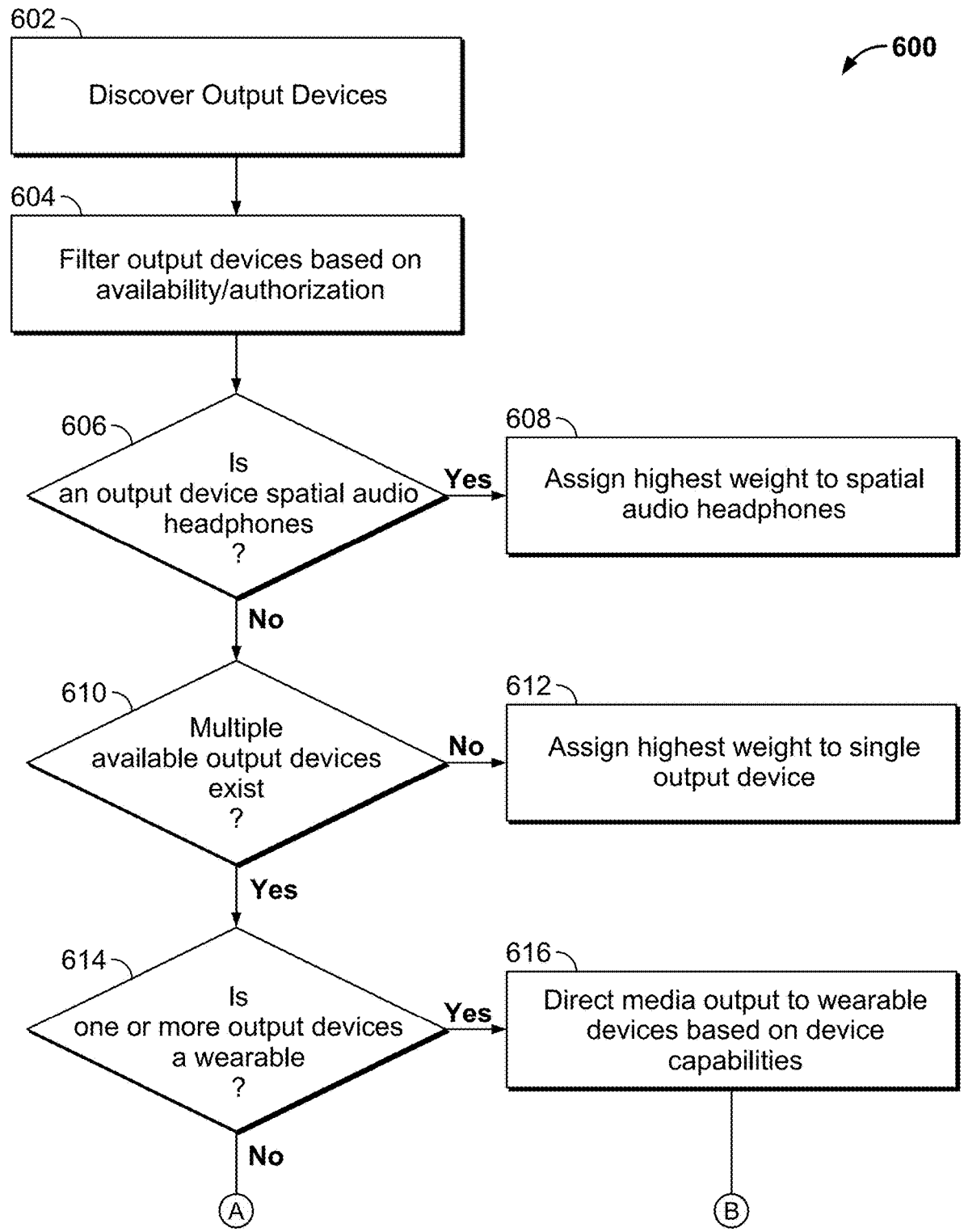
FIG. 6 is a block diagram of process 600 for identifying audio output devices to render supplemental content corresponding to a product icon that a user has interacted with, in accordance with some embodiments of the disclosure.
Figure 6:
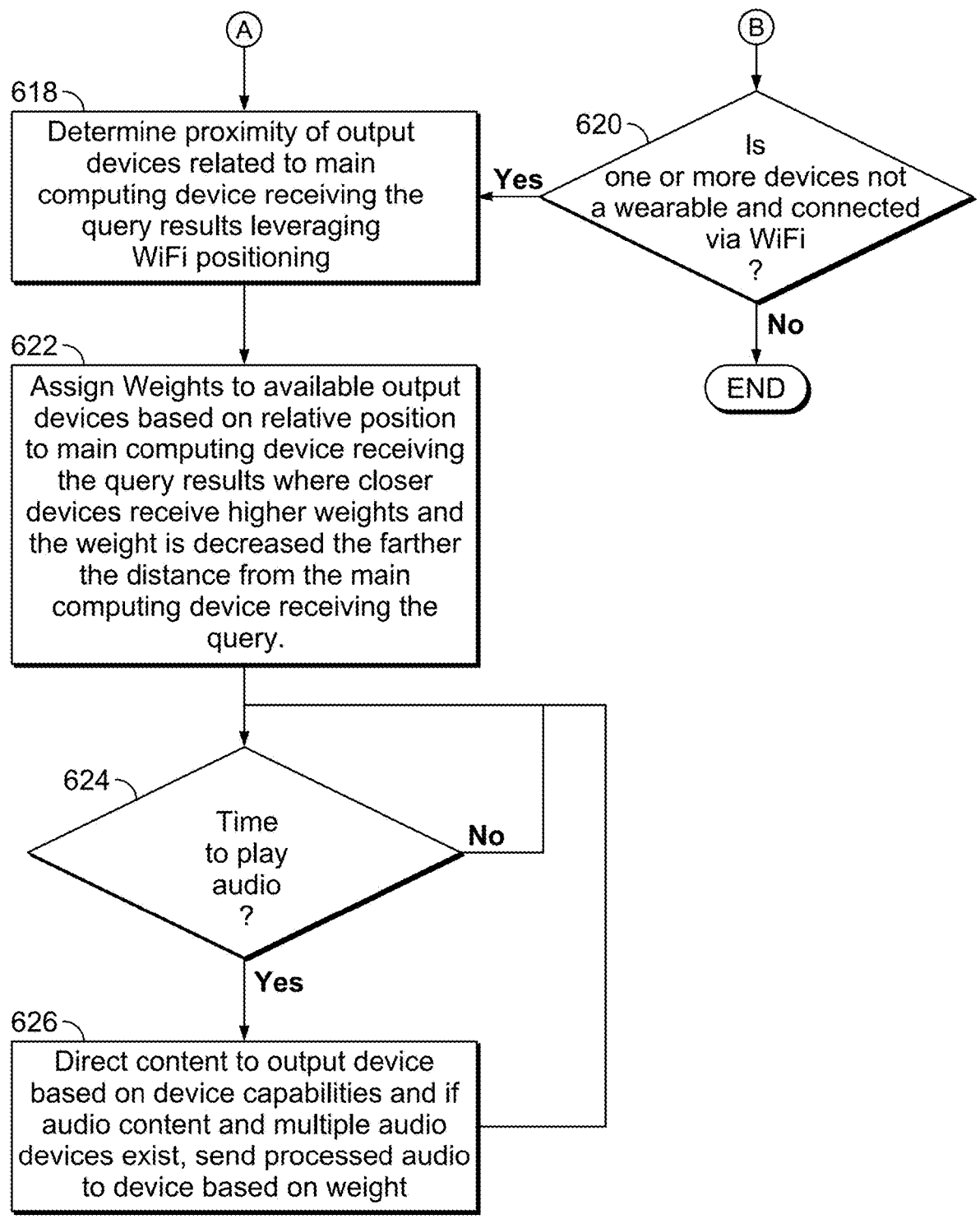

FIG. 6 is a block diagram of process 600 for identifying audio output devices to render supplemental content corresponding to a product icon that a user has interacted with, in accordance with some embodiments of the disclosure. Process 600 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

At process block 602, output devices are discovered. For example, one or more of a user device or a smart home assistant device identified one or more audio output devices, visual output devices, or XR content rendering devices based on a local or other network connection and statuses of devices communicated there through. At process block 604, output devices are filtered based on one or more of authorization settings of respective output devices or availability and statuses thereby of the output devices as determined by responses from the output devices to requests for one or more of authorization of pairing or use, or availability statuses, from one or more of a user device or a smart home assistant device. At decision block 606, a determination is made whether one of the filtered output devices comprises spatial audio headphones (e.g., headphones configured to render audio output such that a user may perceive different proximities of different sound sources as presented via the headphones). If it is determined that at least one output device comprises spatial audio headphones (YES at 606), then a highest weight is assigned to the spatial audio headphones at process block 608. The highest weight corresponds to a priority or other flag which indicates to the systems and devices of this disclosure that the spatial audio headphones should be the primary device for rendering audio output (e.g., corresponding to supplemental content associated with one or more product icons of a product list retrieved in response to a query) for user perception. If it is determined that none of the discovered or filtered output devices comprise spatial audio headphones (NO at 606), then decision block 610 is used to identify whether multiple available output devices exist. If it is determined that there are not multiple devices available or existing (NO at 610), then the highest weight is assigned to the single available discovered output device at process block 612. If it is determined that there are multiple available output devices (YES at 610), then decision block 614 is used to determine if one or more discovered output devices are wearable devices.

Using decision block 614, if it is determined that one or more discovered output devices is not wearable (NO at 614), then a proximity of output devices is determined relative or related to the main computing device (e.g., the device performing the discovering at process block 602), wherein the main computing device is receiving the query results by leveraging Wi-Fi signals and signal strength to determine positioning of discovered devices at process block 618. If it is determined that one or more discovered output devices is wearable (YES at 614), then media output is directed to wearable devices based on device capability as identified and determined at process block 616. For example, audio of supplemental content may be transmitted with rendering or playback instructions to a wearable device as opposed to a mounted or stationary speaker. Using decision block 620, a determination is made whether one or more discovered devices is not wearable and also is connected to Wi-Fi. If it is determined that there are no discovered devices that are not wearable while also being connected to Wi-Fi (NO at 620), then process 600 ends. If it is determined that there are discovered devices that are not wearable while also being connected to Wi-Fi (YES at 620), then a proximity of output devices is determined relative or related to the main computing device (e.g., the device performing the discovering at process block 602), wherein the main computing device is receiving the query results by leveraging Wi-Fi signals and signal strength to determine positioning of discovered devices at process block 618. At process block 622, weights to available discovered output devices are assigned based on a determined or approximated relative position between a respective discovered output device and the main computing device receiving the query results. Closer devices receive higher weights and the weight assigned to farther away devices is decreased proportionally, exponentially, or logarithmically based on how far away from the main computing device the farther away devices are determined or approximated to be positioned.

Using decision block 624, a determination is made whether a current time is appropriate to play audio (e.g., supplemental content corresponding to one or more products of a retrieved product list). For example, the user may be using headphones for a business call and sound effects are configured to be repressed based on user profile or user device settings during business related calls. If it is determined that it is not an accepted or appropriate time to play audio (NO at 624), then process 600 remains in a check loop at decision block 624 to determine the next appropriate time to potentially render audio output content for user perception. If it is determined that audio can be played (YES at 624), then content is directed to one or more discovered and weighted output devices based on respective device capabilities at process block 626. If audio content and multiple audio devices exist, then processed or available audio is cascaded throughout the one or more devices based on assigned weights of each of the one or more devices.

Figure 7:
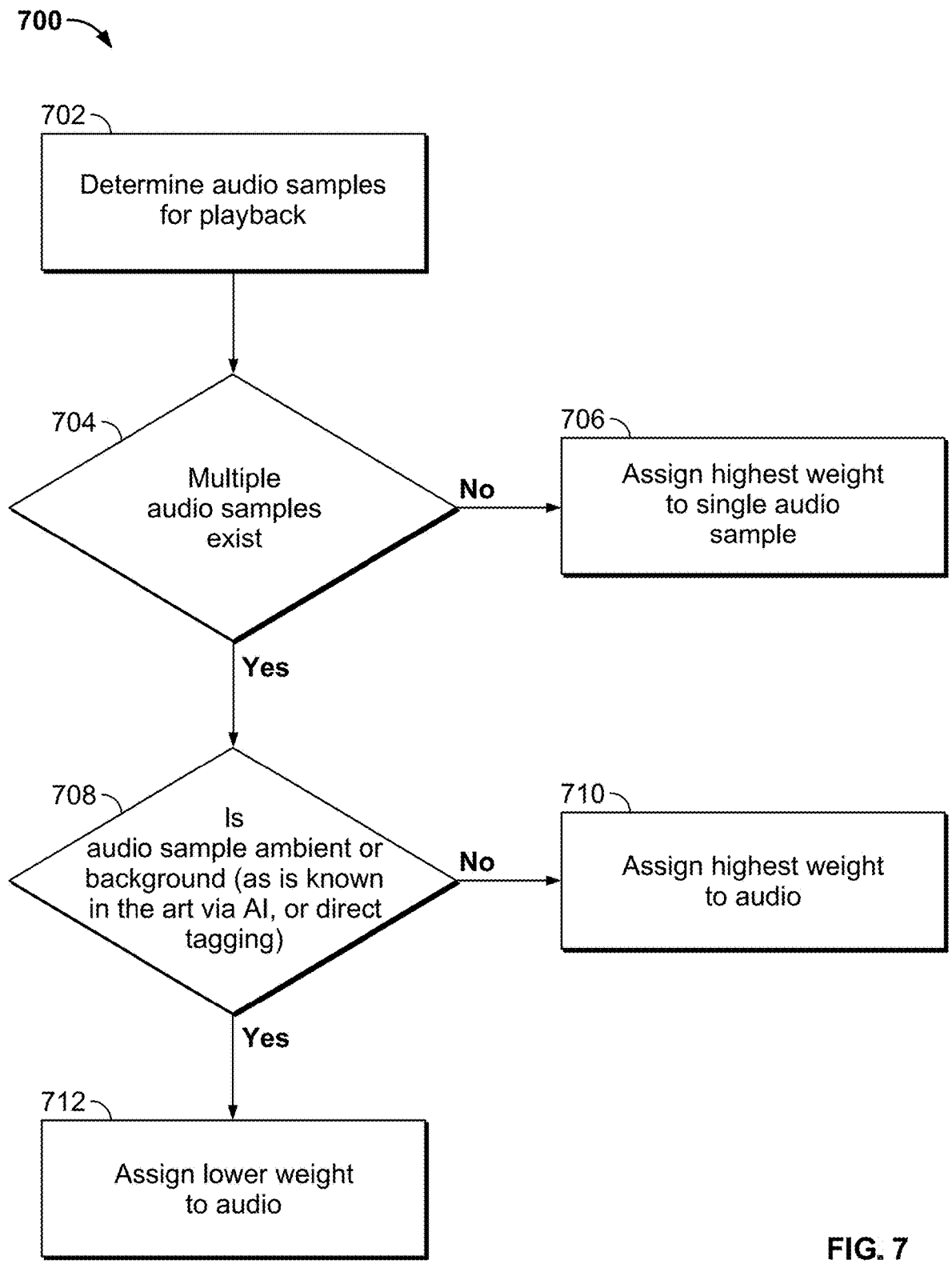
FIG. 7 is a block diagram of process 700 for identifying audio samples corresponding to supplemental content and assigning weights to the audio samples for priority of playback on one or more audio output devices, in accordance with some embodiments of the disclosure.

FIG. 7 is a block diagram of process 700 for identifying audio samples corresponding to supplemental content and assigning weights to the audio samples for priority of playback on one or more audio output devices, in accordance with some embodiments of the disclosure. Process 700 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

At process block 702, audio samples for playback are determined to be available. For example, a user may provide a query that requests a list of products be retrieved. One or more products may have icons or advertisements corresponding to or comprising supplemental content for playback, such as audio that is either background auxiliary noise (e.g., environmental sounds) or an express track of an oral description or song. Decision block 704 is used to determine if multiple audio samples exist. If it is determined that multiple audio samples do not exist (NO at 704), then a highest weight is assigned to a single audio sample at process block 706. If it is determined that multiple audio samples do exist (YES at 704), then decision block 708 is used to determine if the audio sample is ambient or background sound (e.g., as would be determined by one or more data structures that a generative AI engine may tag or assign to the audio sample to provide devices with rendering criteria for the audio sample). If it is determined the audio sample is neither ambient nor background in nature (NO at 708), then the highest weight is assigned to the audio at process block 710. If it is determined the audio sample is one or more of ambient or background in nature (YES at 708), then a lower or the lowest possible weight for rendering the sound is assigned at process block 712. This enables a systematic classification of audio retrieved as supplemental content and provides an organized means of transmitting audio files with rendering instructions in a system configured for creating an immersive shopping experience when paired with an e-commerce application.

In some embodiments, the audio sample includes a plurality of audio tracks. For example, where decision block 704 is used to determine if multiple audio samples exist, an audio sample may comprise a plurality of audio tracks. Additionally, or alternatively, there may be multiple audio samples that complement each other (e.g., primary and secondary audio samples) which can be blended together depending on available devices or proximity of a content item to a list of products rendered for display. Where there are multiple audio samples or tracks, the sample that is considered neither an ambient track or a background track (e.g., is not a secondary track) is assigned a highest audio weight when identifying when or via which device to render some or all of the audio sample for user perception. The samples that are considered ambient or background tracks are assigned lower audio weights and are not considered the most pertinent to render in order to provide a user with an immersive experience. In some embodiments, where there are multiple ambient or background tracks (e.g., for different products on a retrieved product list), a higher weight is assigned to audio associated with products that are on or closer to a display of a device that shows the list of retrieved products than the weight assigned to audio associated with products that are not on the display and are multiple user inputs away from appearing on the display. In another embodiment, all ambient or background audio may be provided a same low priority weight and are not prioritized for rendering for user perception (e.g., where no secondary audio output device is detected for pairing or the user has indicated either through application or device settings the user is not interested in ambient or background sounds).

Figure 8:
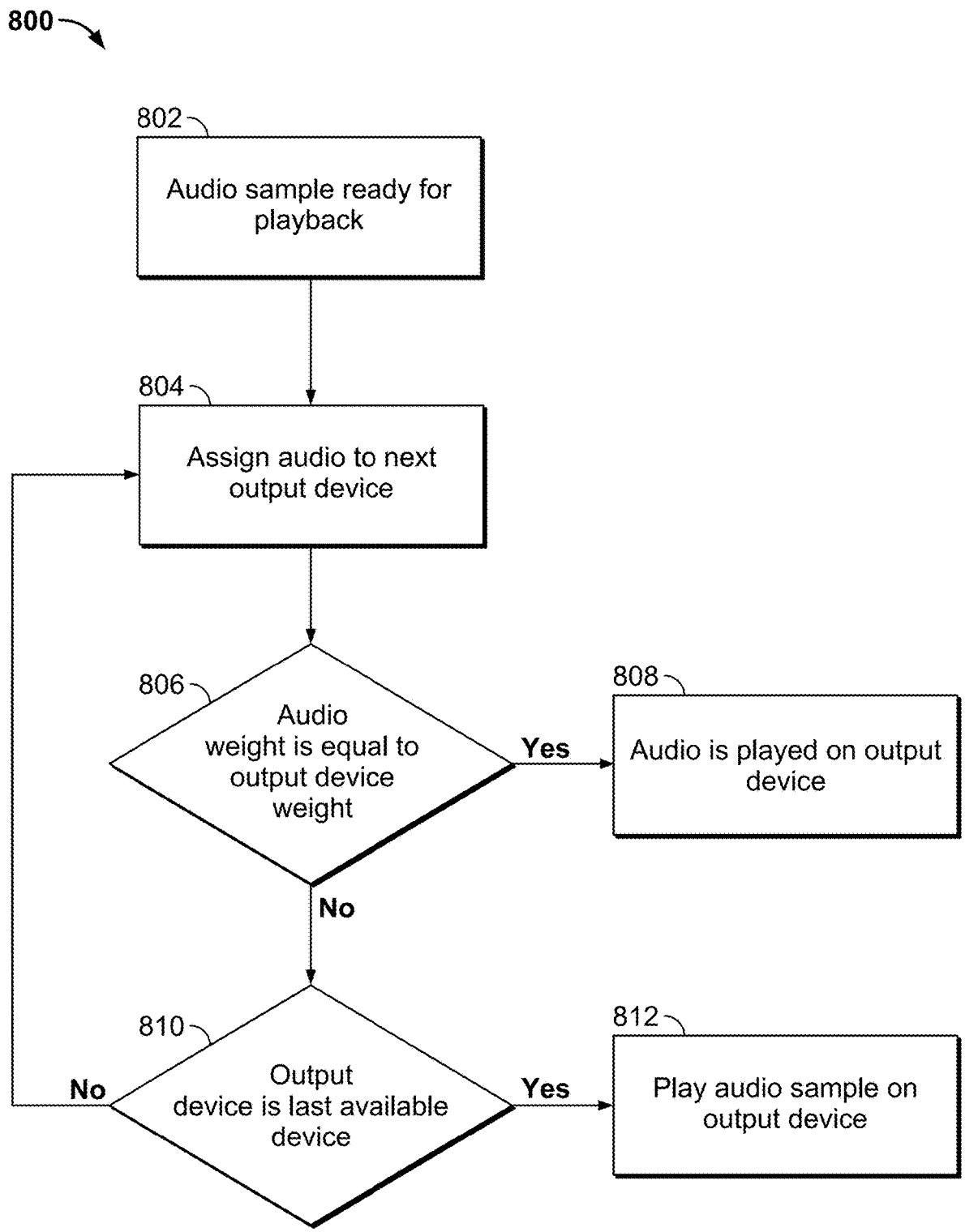
FIG. 8 is a block diagram of process 800 for assigning audio samples to one or more audio output devices based on one or more of the device availability for playing audio samples or the device compatibility with the audio samples, in accordance with some embodiments of the disclosure.

FIG. 8 is a block diagram of process 800 for assigning audio samples to one or more audio output devices based on one or more of the device availability for playing audio samples or the device compatibility with the audio samples, in accordance with some embodiments of the disclosure. Process 800 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

At process block 802, at least one audio sample (e.g., retrieved or received based on a user interaction with an e-commerce interface that has rendered a list of products for user perception and interaction) is determined to be ready for playback. At process block 804, the audio is assigned to a next available and paired output device. Decision block 806 is used to compare the assigned weight of the audio sample (e.g., as determined from a data structure a generative AI engine may assign or as assigned by one or more of a vender or e-commerce system) to the assigned weight of the available output device (e.g., as accomplished by a system executing process 600 of FIG. 6). If it is determined that audio sample weight is equal to the output device weight (YES at 806), then the audio sample is provided to the output device and played via the output device at process block 808. If it is determined that the audio sample weight is not equal to the output device weight (NO at 806), then decision block 810 is used to determine if the output device is the last available device. If it is determined that the output device is not the last available device (NO at 810), then the audio sample is assigned for playback to the next available output device at process block 804. If it is determined that the output device is the last available device (YES at 810), then the audio sample is played via the output device at process block 812.

Figure 9:
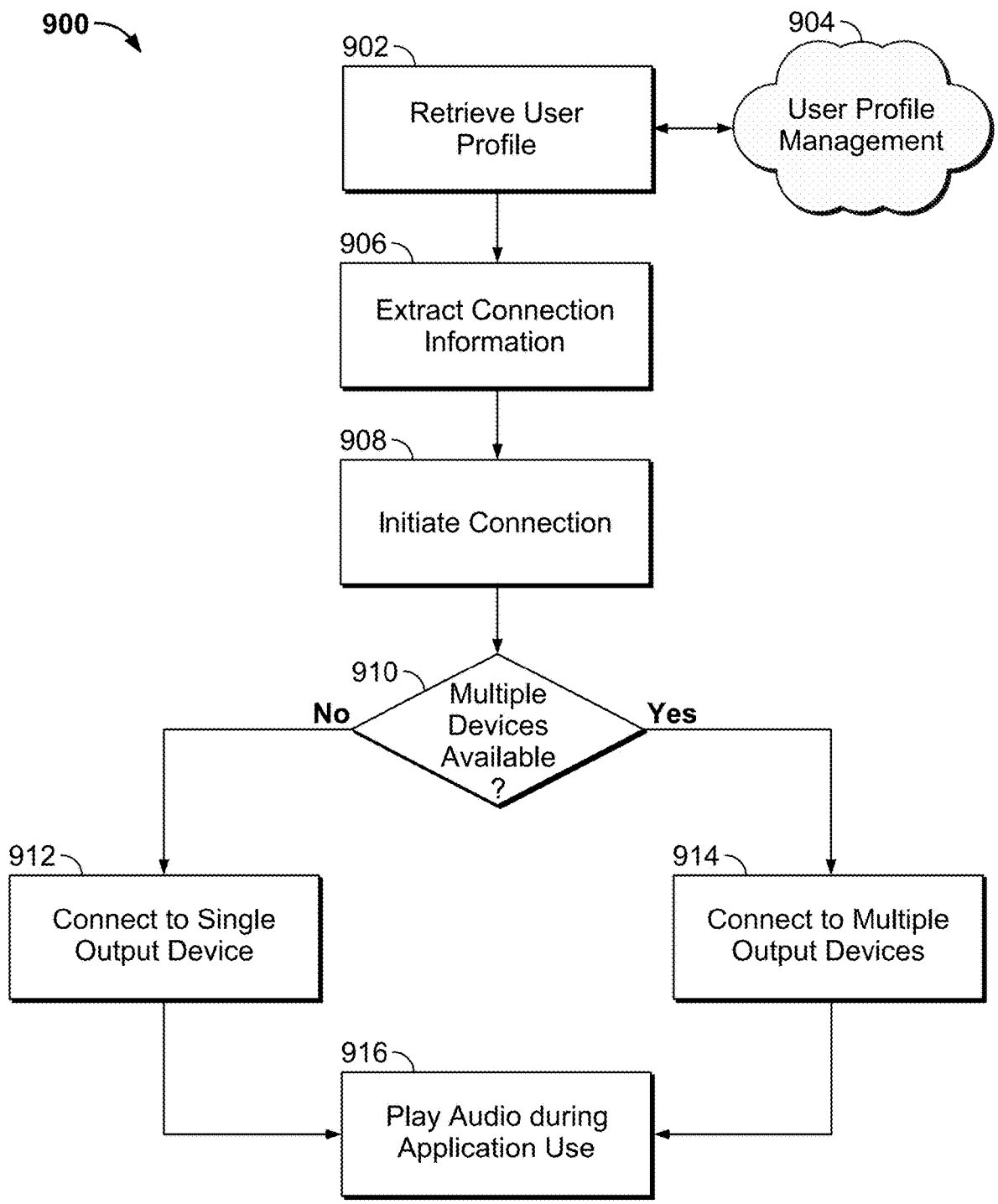
FIG. 9 is a block diagram of process 900 for playing audio based on user profile data, in accordance with some embodiments of the disclosure.

FIG. 9 is a block diagram of process 900 for playing audio based on user profile data, in accordance with some embodiments of the disclosure. Process 900 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

At process block 902, user profile information is retrieved. As shown in FIG. 9, user profile management configuration 904 is communicatively coupled to a system configured to execute process 900. User profile management configuration 904 may comprise one or more of a server, a device memory, a network, or at least one data structure configured to receive and stored updated user profile data. At process block 906, connection information is extracted. For example, the connection information may identify one or more networks or communication means between a user device and devices communicatively available to the user device for rendering audio, visual, or XR content for user perception based on the receipt of instructions to render corresponding supplemental content as caused by a user interaction with at least one product of a retrieved product list. At process block 908, a connection is initiated (e.g., between the user device and at least one secondary device configured to render supplemental content). Decision block 910 is used to determine if multiple devices are available. If it is determined that multiple devices are not available (NO at 910), then a single output device is connected with at process block 912. If it is determined that multiple devices are available (YES at 910), then multiple output devices are connected to. At process block 916 (e.g., in response to the connection or connections achieved), audio is played during use of the e-commerce application. In some embodiments, the audio is replaced with or paired with one or more of visual or XR supplemental content.

Figure 10:
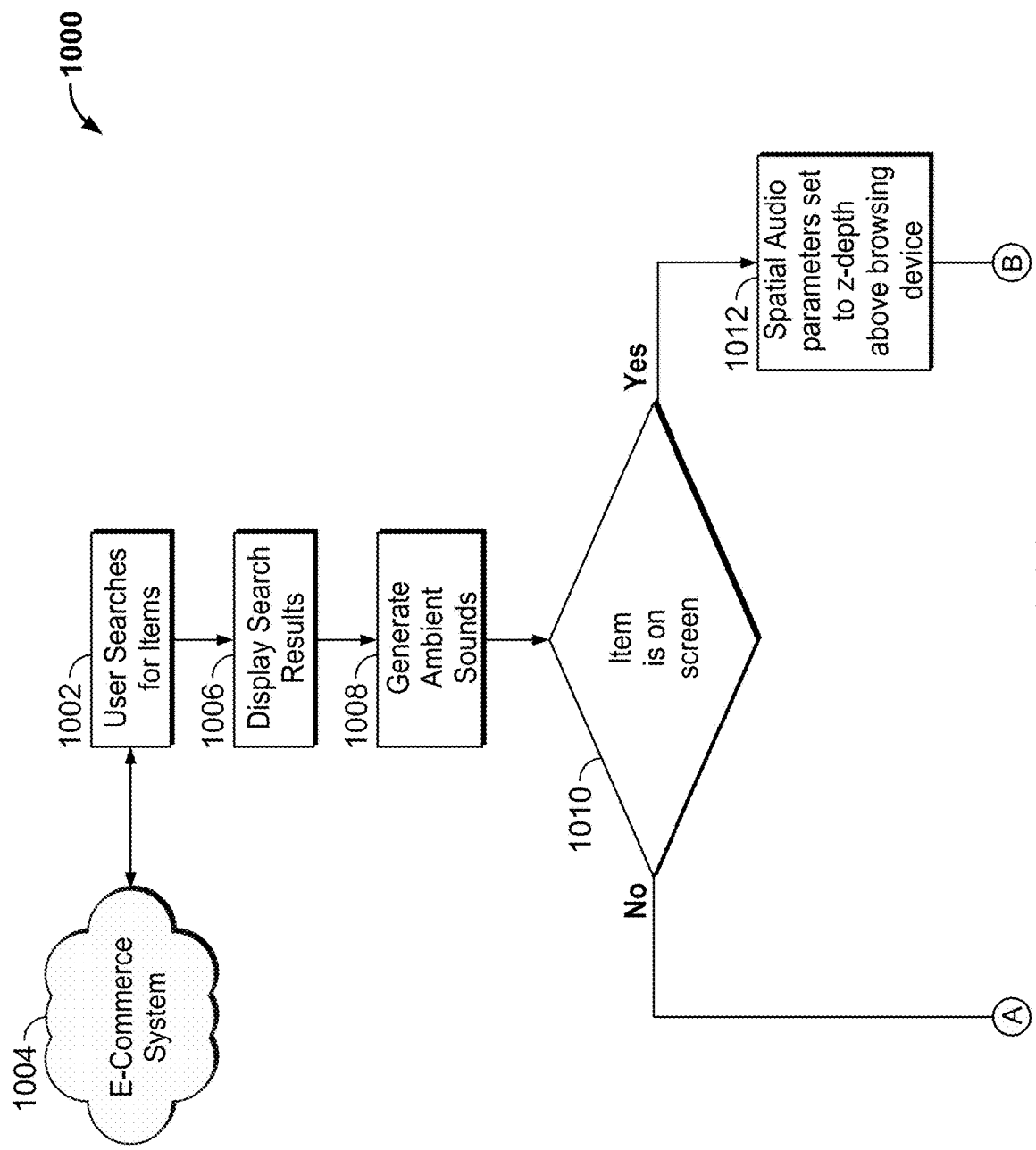
FIG. 10 is a block diagram of process 1000 for rendering supplemental content for user perception based on one or more audio output devices and based on user interaction with an e-commerce system, in accordance with some embodiments of the disclosure.
Figure 10:
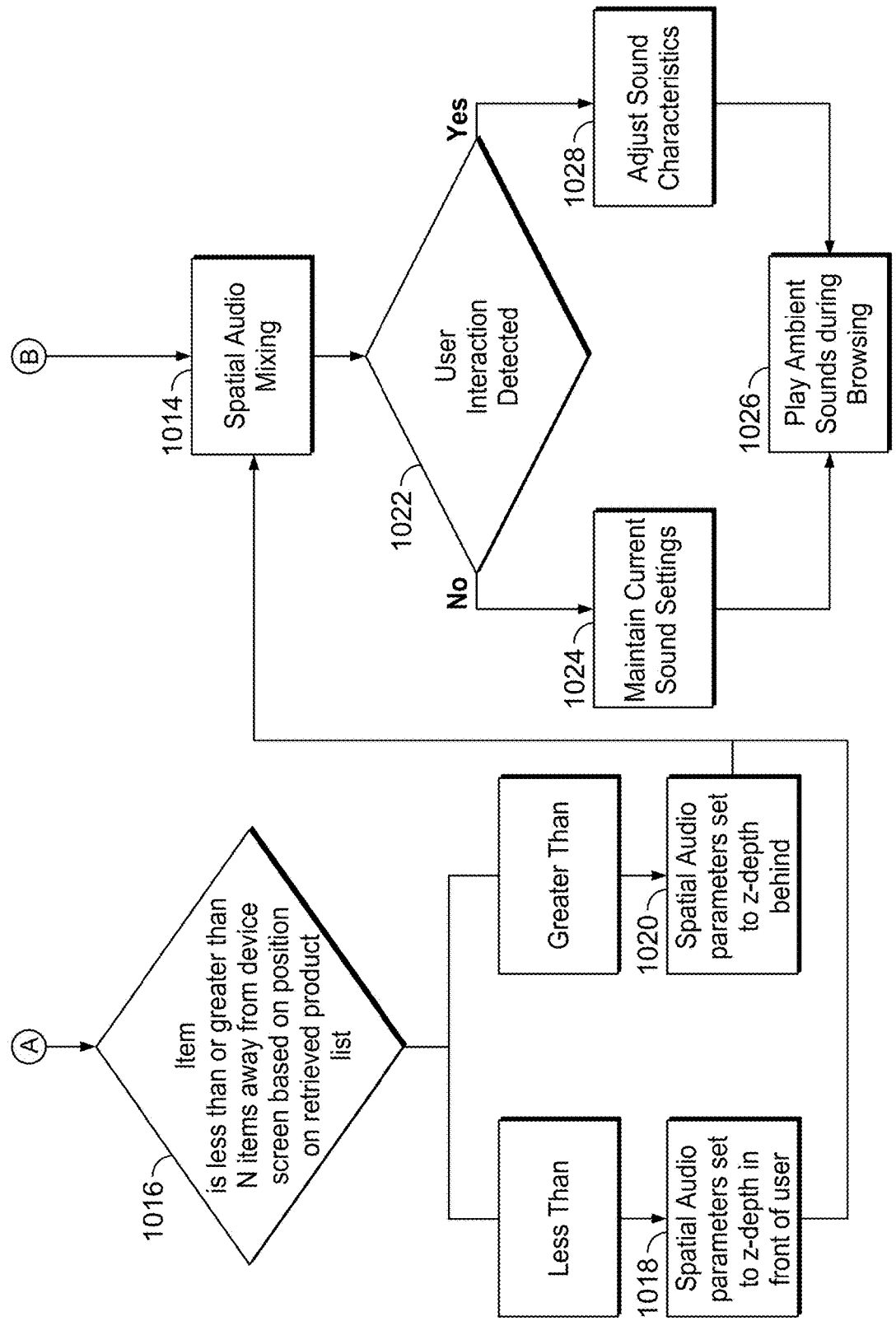

FIG. 10 is a block diagram of process 1000 for rendering supplemental content for user perception based on one or more audio output devices and based on user interaction with an e-commerce system, in accordance with some embodiments of the disclosure. Process 1000 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

At process block 1002, a user searches for items or products via e-commerce system 1004. E-commerce system 1004 may comprise one or more servers, interfaces, or data stores configured to provide a user of a device a list of products to browse and potentially purchase. At process block 1006, search results are displayed for the user (e.g., on the device used to perform the search for the items or products). At process block 1008, ambient sounds are generated. For example, at least one generative AI engine may be utilized to generate at least one audio track corresponding to supplemental content for one or more products of the list of products. Decision block 1010 is used to determine if a particular item or product of the search results (e.g., product list) is on a screen of the device the user has access to. If it is determined that the item (e.g., a selectable product icon corresponding to the item) is on screen (YES at 1010) for example based on a scrolling input from a user to the list of products, then rendering criteria for spatial audio parameters are set to a z-axis (e.g., where the origin point of the axis is the user or device location and the axis is defined in measurement units displaced from the user or device location) depth displaced from a browsing device on which the user is interacting with the product list at process block 1012. For example, if the item appears towards a lower border on the screen, the spatial audio may be rendered to sound as if its vertically distant from the user. In another example, if the item appears in an area of focus for the user or is other directly interacted with by the user (e.g., as explained in relation to FIG. 1), the spatial audio may be rendered to sound as if the user is right next to or immersed in the source of the audio. At process block 1014, spatial audio mixing occurs where various audio outputs are rendered by one or more paired or accessible output devices to create a depth of sound for user perception.

If it is determined that the item (e.g., a selectable product icon corresponding to the item) is not on screen (NO at 1010) for example based on a scrolling input from a user to the list of products, then decision block 1016 is used to determine if the item is less than or greater than N number of items away from being on a user device screen based on the relative position of the item on the retrieved product list. The N number of items may be an integer type number that is modifiable by one or more of e-commerce application settings, user profile settings, user device settings, or data structures paired with the supplemental content associated with the item (e.g., the selectable product item) which may define rendering criteria for different audio components or samples. In some embodiments, the N number of items is translatable into a weight to be assigned to each item of the N number of items. For example, items near a beginning of the list or close to (e.g., one icon away from a device display on a manipulatable list) the device display on which a user is scrolling may be assigned a higher weight proportional to the value of N. Additionally, or alternatively, items further from the beginning of the list, or the device display, would have a weight inversely proportional to N or inversely proportional to the weight N provided to the top item of the list. If it is determined the item is less than N items away from the device screen via decision block 1016, then spatial audio rendering parameters are set to a z-depth along the z-axis in front of the user at process block 1018 and spatial audio mixing occurs via process block 1014. If it is determined the item is greater than N items away from the device screen via decision block 1016, then spatial audio rendering parameters are set to a z-depth along the z-axis behind of the user at process block 1020 and spatial audio mixing occurs via process block 1014.

Decision block 1022 is used to determine if a user interaction is detected either during or after the spatial audio mixing caused by process block 1014. If it is determined that no user interaction is detected (NO at 1022), then current sound settings are maintained at process block 1024 and ambient sounds are played while the user is browsing at process block 1026. If it is determined that user interaction is detected YES at 1022), then current sound settings are adjusted at process block 1028 (e.g., based on the nature of the user interaction such as adjusting volume settings for any or all sounds or scrolling closer towards the item icon on the product list) and ambient sounds are played while the user is browsing at process block 1026 based on the adjust sound characteristic.

Presenting spatial audio that corresponds to the item a user is browsing for and interacting with via a user device may be contingent on one or more of the nature, frequency, or intensity of a user interaction with a returned product or item list in response to a user query or prompt. At least one of a speed of a user scroll input or a direction of a user scroll input may affect the rendering criteria for the spatial audio (e.g., as the user interacts with the returned list of products or items from the e-commerce application). In some embodiments, parameters for presenting spatial audio which corresponds to the item a user is browsing based on one or more of the speed or the direction of a user scroll can be sourced from a user interaction with the product list via a secondary device. For example, a primary device may be a mobile phone or tablet. A secondary device may be one or more of headphones, a smart home assistant device, or other hardware configured for rendering audio outputs for user perception. In some embodiment, audio may be output or rendered based on real-time data and interactions with a content system (e.g., one or more of an over the top content presentation and distribution service, an e-commerce application, or general voice queries directed to a VAS). Creating, rendering, or generating spatial audio sounds and products may be accomplished by incorporating one or more generative AI engines based on the results returned by a query within an e-commerce application. Modifications to the generated audio sounds may be considered by the generative AI engine or engines based on the user browsing experience (e.g., as defined by user activity corresponding to scrolling speed, extended or deep looks at particular item, or other indicators of user interest or focus) as well as audio samples recorded by a smart home assistant if allowed by a user.

Figure 11:
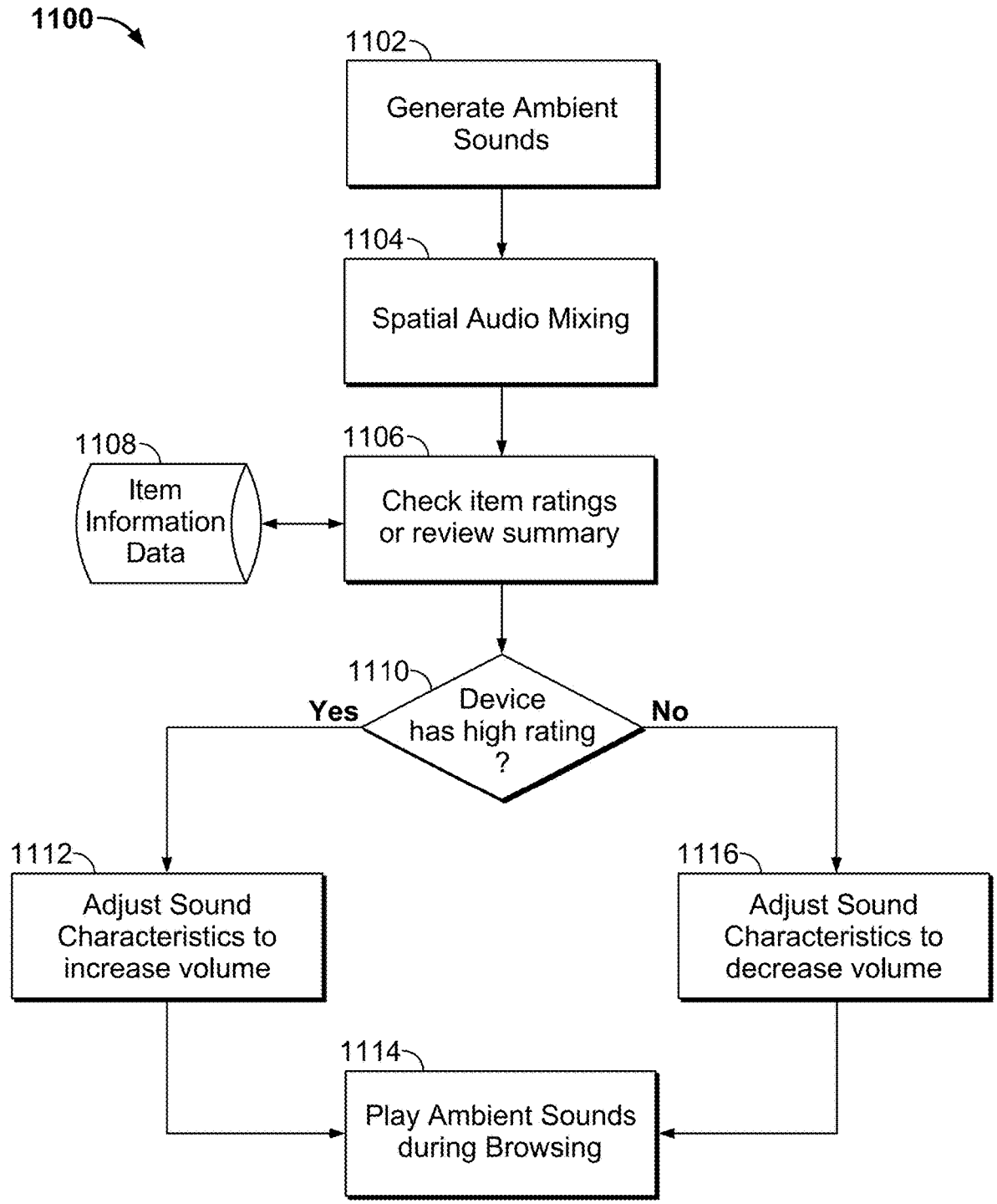
FIG. 11 is a block diagram of process 1100 for generating ambient sounds corresponding to supplemental content of a selectable product icon, in accordance with some embodiments of the disclosure.

FIG. 11 is a block diagram of process 1100 for generating ambient sounds corresponding to supplemental content of a selectable product icon, in accordance with some embodiments of the disclosure. Process 1100 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

At process block 1102, ambient sounds are generated. For example, a user may have requested a list of products on a device via an e-commerce application based on a query. One or more items on the list of products may have supplemental content such as ambient sounds (e.g., environmental or background immersive sounds) to improve user interest with a particular product as represented by at least one selectable product icon. At process block 1104, spatial audio mixing is executed (e.g., as described in reference to FIG. 10). At process block 1106, one or more of item ratings or item review summaries are reviewed or checked (e.g., as available based on accessible data structures or data storage components via the e-commerce application). In some embodiments, item information data store 1108 may be accessed (e.g., as represented by the one or more server structures or data stores in FIG. 2A). Decision block 1110 is used to determine if the device used for ambient sound rendering and spatial sound mixing has a high enough rating for continuing to render audio at current parameters. If it is determined the device does have a high enough rating based on current rendering parameters (YES at 1110), then the sound characteristics are adjusted to increase volume to further immerse the user in the current browsing or shopping session at process block 1112, and the ambient sounds are played during browsing at process block 1114. If it is determined the device does not have a high enough rating based on current rendering parameters (NO at 1110), then the sound characteristics are adjusted to decrease volume to keep the user engaged in the current browsing or shopping session at process block 1112 without giving the user a less than satisfactory experience via the rendered ambient sounds, and the ambient sounds are played during browsing at process block 1114.

Figure 12:
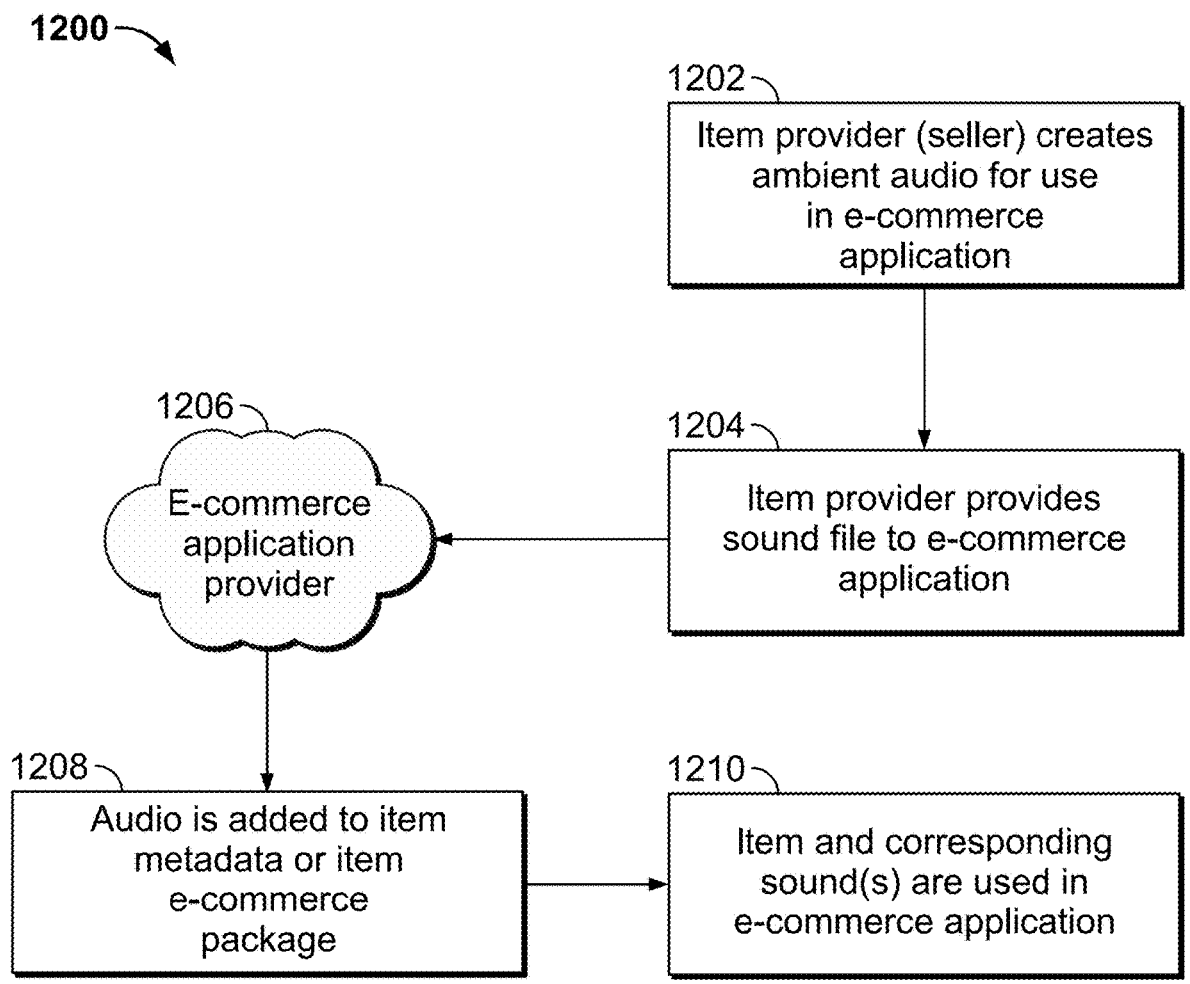
FIG. 12 is a block diagram of process 1200 for pairing supplemental content with elements of an e-commerce application, in accordance with some embodiments of the disclosure.

FIG. 12 is a block diagram of process 1200 for pairing supplemental content with elements of an e-commerce application, in accordance with some embodiments of the disclosure. Process 1200 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

At process block 1202, an item provider (e.g., item seller or vender) creates ambient audio for use in an e-commerce application. For example, a vender may determine ambient audio can result in increased interest in a particular product. Either using at least one generative AI engine by providing at least one prompt or by sourcing one or more experts to create an ambient audio file, the vender may provide an audio file for integration into an e-commerce application such that the audio file is available for distribution with imagery, icons, or descriptions of a product available through an e-commerce application. At process block 1204, the item provider provides the sound file to at least one e-commerce application. For example, e-commerce application provider server 1206 corresponds to a data storage or data structure of an e-commerce application configured to receive files or data structures for distribution to end user devices when the e-commerce application is activated and interacted with on any user device. At process block 1208, at least one data structure corresponding to the audio is added to metadata of a particular item or is added to an item e-commerce package (e.g., a data structure corresponding to one or more selectable product or item icons). At process block 1210, the item and corresponding sound data structure or data structures are used in the e-commerce application (e.g., based on user interaction with one or more of the product icons or the e-commerce application interface).

Figure 13:
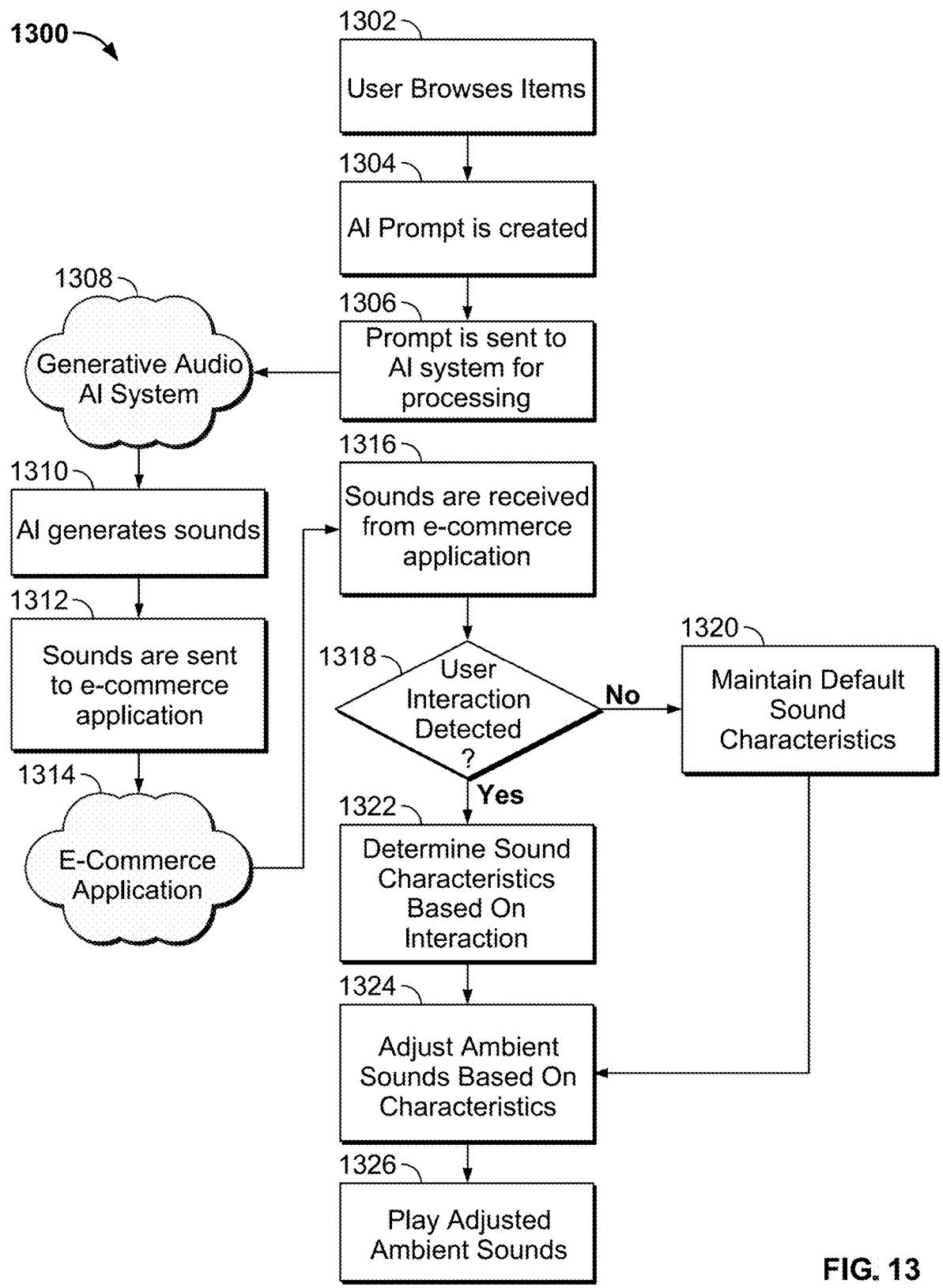
FIG. 13 is a block diagram of process 1300 for using a generative audio AI system to generate an audio output for user perception based on user interaction with an e-commerce application, in accordance with some embodiments of the disclosure.

FIG. 13 is a block diagram of process 1300 for using a generative audio AI system to generate an audio output for user perception based on user interaction with an e-commerce application, in accordance with some embodiments of the disclosure. Process 1300 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

At process block 1302, a user provides an input corresponding to browsing items on a user device (e.g., the user provides a prompt or query for a list of products via an e-commerce application or interface). At process block 1304, an AI prompt is created or generated based on one or more elements, characters, or aspects of one or more of the user browsing activities, the product list, or the user input corresponding to a query for a list of products. At process block 1306, the prompt is sent to an AI system (e.g., one or more processors configured for one or more of interfacing with, act as, or utilizing a generative AI engine) for processing of the prompt by the AI system. Generative Audio AI system 1308 is one example of a representative generative AI engine configured to receive and process prompts to generate a data structure corresponding to a desired output (e.g., an audio file). At process block 1310, the AI system generates one or more data structures corresponding to sounds or audio outputs to be paired or associated with at least one item of a retrieved list of products via an e-commerce application. At process block 1312, sounds are sent or transmitted to an e-commerce application (e.g., e-commerce application 1314). At process block 1316, sounds are received from the e-commerce application by a device or processor configured to pair the sound data structures of the sounds with rendering criteria for one or more audio output devices. Decision block 1318 is used to determine if user interaction is detected at, for example, a user device on which a query was provided for generating the AI prompt. If it is determined that user interaction is not detected (NO at 1318), then default sound characteristics (e.g., as defined by the user device or setting accessible thereby) are maintained for user perception at process block 1320. If it is determined that user interaction is detected (YES at 1318), then sound characteristics (e.g., one or more of bass or treble levels, volume levels, spatial source mimicking, sound quality, or other adjustable parameters of sound related data structure processable by an audio output device or processing circuitry thereof), are determined based on one or more of the nature, type, extent, quality, or purpose of the user interaction at process block 1322. At process block 1324, ambient sounds of the AI generated sound or sounds are adjusted based on the characteristics determined from the user interactions. At process block 1326, the adjusted ambient sounds are played or rendered for user perception via at least one audio output device.

Figure 14:
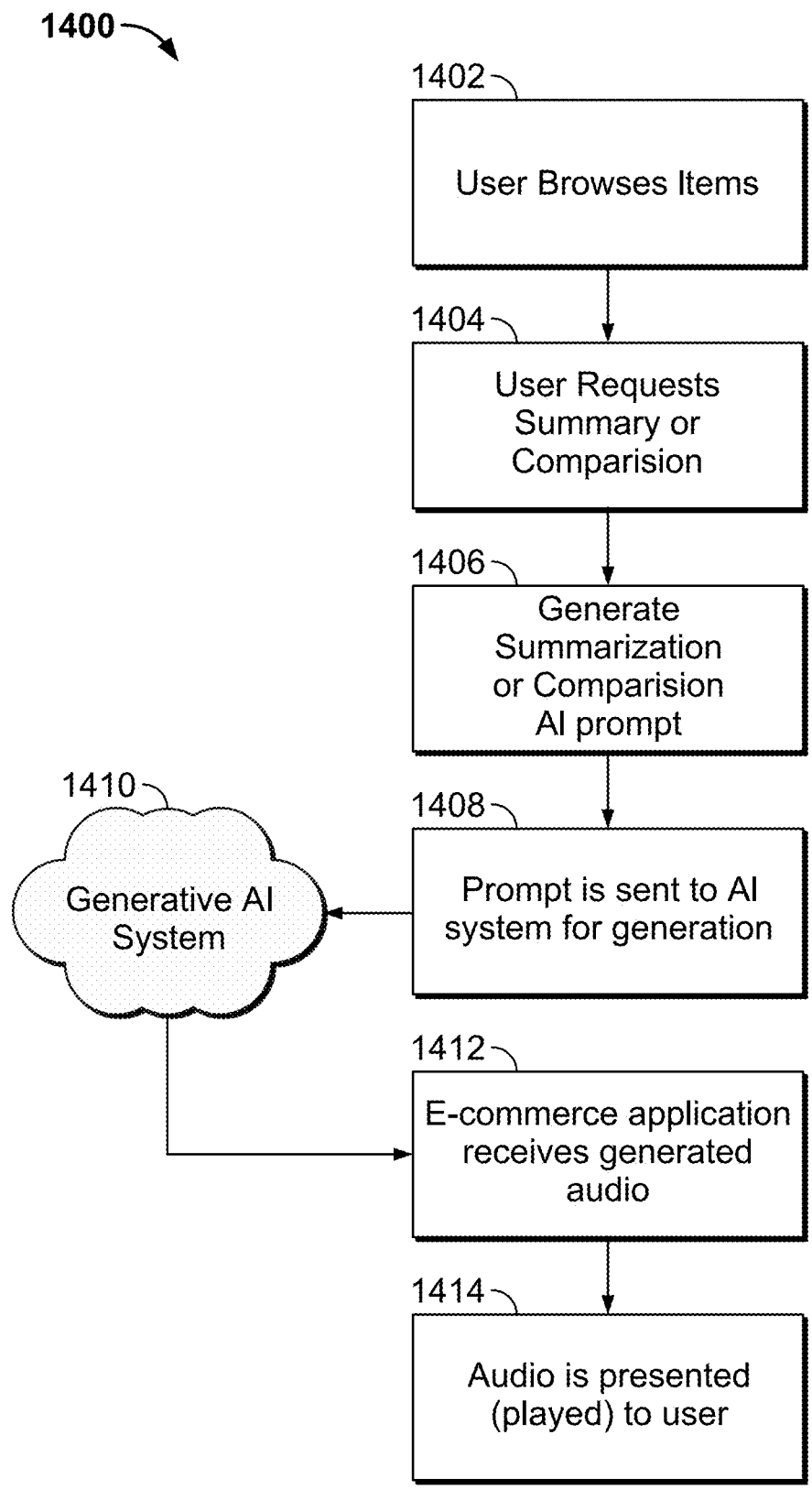
FIG. 14 is a block diagram of process 1400 for using a generative audio AI system to generate an audio output for user perception based on user interaction with an e-commerce application, in accordance with some embodiments of the disclosure.

FIG. 14 is a block diagram of process 1400 for using a generative audio AI system to generate an audio output for user perception based on user interaction with an e-commerce application, in accordance with some embodiments of the disclosure. Process 1400 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

At process block 1402, a user browses for products or items via an e-commerce interface rendered for user interaction at a user device. At process block 1404, the user provides an input to request one or more of a summary or comparison of two or more products retrieved in response to a user query for a list of products or items. At process block 1406, one or more of a summary comparison AI prompt is generated based on the user input corresponding to the request. At process block 1408, the prompt is transmitted or sent to an AI system (e.g., one comprising one or more processors or data stores configured to generate data structures in response to received prompts) such as generative AI system 1410. In response to generative AI system 1410 generating and transmitting the generated comparison or summary to the e-commerce application, the e-commerce application receives generated audio at process block 1412, wherein the generated audio corresponds to supplemental content to influence the user's preference for one of the compared or summarized products. At process block 1414, the audio is presented, played, or rendered for user perception using one or more audio output devices or circuitries.

Figure 15:
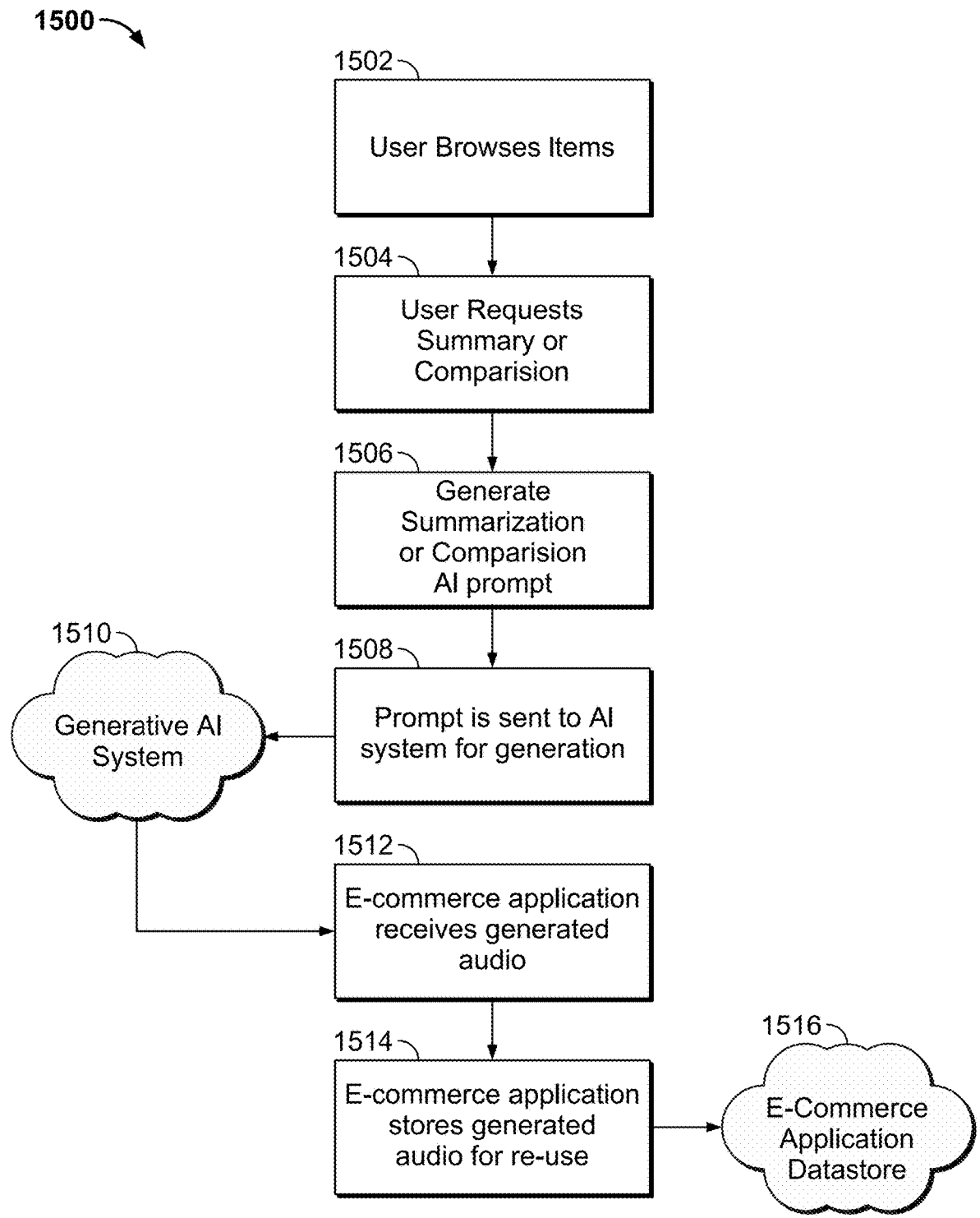
FIG. 15 is a block diagram of process 1500 for using a generative audio AI system to generate an audio output for user perception based on a user request to compare products retrieved in response to a user query provided through an e-commerce application, in accordance with some embodiments of the disclosure.

FIG. 15 is a block diagram of process 1500 for using a generative audio AI system to generate an audio output for user perception based on a user request to compare products retrieved in response to a user query provided through an e-commerce application, in accordance with some embodiments of the disclosure. Process 1500 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

At process block 1502, a user browses for products or items via an e-commerce interface rendered for user interaction at a user device. At process block 1504, the user provides an input to request one or more of a summary or comparison of two or more products retrieved in response to a user query for a list of products or items. At process block 1506, one or more of a summary comparison AI prompt is generated based on the user input corresponding to the request. At process block 1508, the prompt is transmitted or sent to an AI system (e.g., one comprising one or more processors or data stores configured to generate data structures in response to received prompts) such as generative AI system 1510. In response to generative AI system 1510 generating and transmitting the generated comparison or summary to the e-commerce application, the e-commerce application receives generated audio at process block 1512, wherein the generated audio corresponds to supplemental content to influence the user's preference for one of the compared or summarized products. At process block 1514, the e-commerce application stores the generated audio for re-use to subsequent user requests or user browsing sessions. The e-commerce application may store the generated audio in, for example, e-commerce application data store 1516, which may correspond to at least one server or processor communicatively accessible via the e-commerce application.

Figure 16:
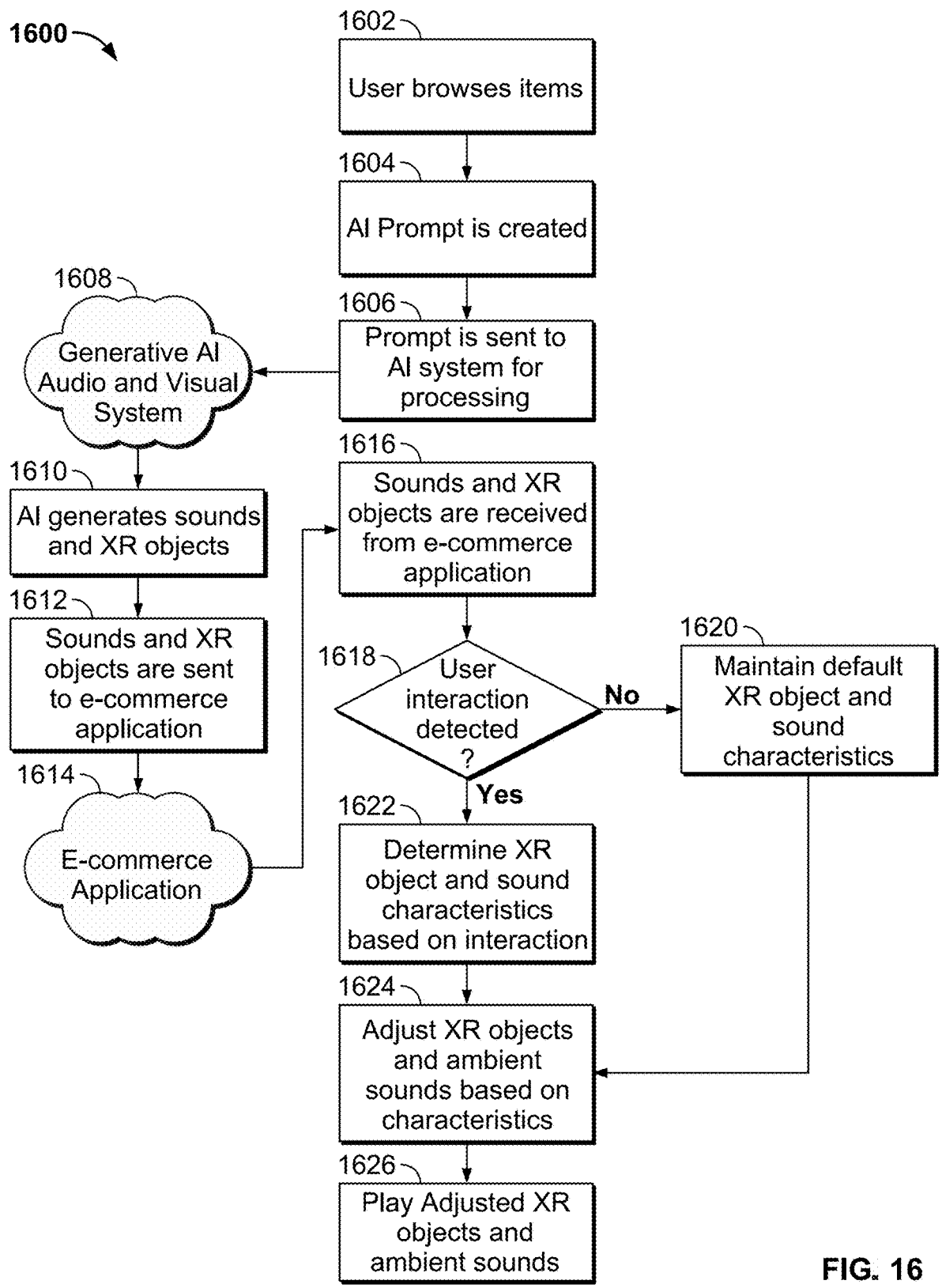
FIG. 16 is a block diagram of process 1600 for using a generative AI system to generate audio and XR elements for user perception based on user interaction with an e-commerce application, in accordance with some embodiments of the disclosure.

FIG. 16 is a block diagram of process 1600 for using a generative AI system to generate audio and XR elements for user perception based on user interaction with an e-commerce application, in accordance with some embodiments of the disclosure. Process 1600 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

At process block 1602, a user provides an input corresponding to browsing items on a user device (e.g., the user provides a prompt or query for a list of products via an e-commerce application or interface). At process block 1604, an AI prompt is created or generated based on one or more elements, characters, or aspects of one or more of the user browsing activity, the product list, or the user input corresponding to a query for a list of products. At process block 1606, the prompt is sent to an AI system (e.g., one or more processors configured for one or more of interfacing with, act as, or utilizing a generative AI engine) for processing of the prompt by the AI system. Generative audio and visual AI system 1608 is one example of a representative generative AI engine configured to receive and process prompts to generate a data structure corresponding to a desired output (e.g., an audio file and at least one data structure for rendering an LED display as active or a combination of videos and images). In some embodiments, generative audio and visual AI system 1608 is configured to generate one or more elements of an XR immersive audio and visual experience with haptic feedback. At process block 1610, the AI system generates one or more data structures corresponding to sounds or audio outputs to be paired or associated with at least one item of a retrieved list of products via an e-commerce application as well as XR content or objects for rendering by capable XR object rendering devices. At process block 1612, data structures of the sounds and XR objects are sent or transmitted to an e-commerce application (e.g., e-commerce application 1614). At process block 1616, the sound and XR object data structures are received from the e-commerce application by a device or processor configured to pair the sound data structures of the sounds with rendering criteria for one or more audio output devices. Decision block 1618 is used to determine if user interaction is detected at, for example, a user device on which a query was provided for generating the AI prompt. If it is determined that user interaction is not detected (NO at 1618), then default sound characteristics (e.g., as defined by the user device or setting accessible thereby) are maintained for user perception at process block 1620. If it is determined that user interaction is detected (YES at 1618), then sound characteristics (e.g., one or more of bass or treble levels, volume levels, spatial source mimicking, sound quality, or other adjustable parameters of sound related data structure processable by an audio output device or processing circuitry thereof as well as various XR rendering settings such as haptic feedback levels and graphics resolutions of various objects or elements in the XR experience), are determined based on one or more of the nature, type, extent, quality, or purpose of the user interaction at process block 1622. At process block 1624, ambient sounds of the AI generated sound or sounds as well as rendered XR objects are adjusted based on the characteristics determined from the user interactions. At process block 1626, the adjusted ambient sounds are played or rendered for user perception via at least one audio output device.

FIG. 17 is a block diagram of process 1700 for using a generative AI system to generate XR elements for user perception based on user interaction with an e-commerce application and user interaction with the generated XR elements, in accordance with some embodiments of the disclosure. Process 1700 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

Process 1700 corresponds to a modified iteration of process 1600 where only XR content is rendered without ambient audio (e.g., to be used when a user disables audio output during a browsing session while maintaining connection to XR rendering devices). At process block 1702, a user provides an input corresponding to browsing items on a user device (e.g., the user provides a prompt or query for a list of products via an e-commerce application or interface). At process block 1704, an AI prompt is created or generated based on one or more elements, characters, or aspects of one or more of the user browsing activity, the product list, or the user input corresponding to a query for a list of products. At process block 1706, the prompt is sent to an AI system (e.g., one or more processors configured for one or more of interfacing with, act as, or utilizing a generative AI engine) for processing of the prompt by the AI system. Generative visual AI system 108 is one example of a representative generative AI engine configured to receive and process prompts to generate a data structure corresponding to a desired output (e.g., at least one data structure for rendering an LED display as active or a combination of videos and images for an immersive XR experience while shopping or browsing on an e-commerce application). In some embodiments, generative visual AI system 1708 is configured to generate one or more elements of an XR immersive visual experience with haptic feedback. At process block 1710, the AI system generates one or more data structures associated with at least one item of a retrieved list of products via an e-commerce application as well as XR content or objects for rendering by capable XR object rendering devices. At process block 1712, data structures of XR objects are sent or transmitted to an e-commerce application (e.g., e-commerce application 1714). At process block 1716, the XR object data structures are received from the e-commerce application by a device or processor configured to pair the XR object data structures with rendering criteria for one or more XR content rendering devices. Decision block 1718 is used to determine if user interaction is detected at, for example, a user device on which a query was provided for generating the AI prompt. If it is determined that user interaction is not detected (NO at 1718), then default XR characteristics (e.g., as defined by the user device or setting accessible thereby) are maintained for user perception at process block 1720. If it is determined that user interaction is detected (YES at 1718), then XR characteristics (e.g., one or more adjustable parameters of various XR rendering settings such as haptic feedback levels and graphics resolutions of various objects or elements in the XR experience), are determined based on one or more of the nature, type, extent, quality, or purpose of the user interaction at process block 1722. At process block 1724, rendered XR objects are adjusted based on the characteristics determined from the user interactions. At process block 1726, the adjusted XR objects are rendered for user perception via at least one device configured for rendering the XR objects for an immersive XR experience while the user is browsing for products via the e-commerce application.

FIG. 18 is a block diagram of process 1800 for using a generative AI system to generate and store XR elements for an e-commerce application, in accordance with some embodiments of the disclosure. Process 1800 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

At process block 1802, a user browses for products or items via an e-commerce interface rendered for user interaction at a user device. At process block 1804, one or more AI prompts for creating XR content or objects is generated based on the user input corresponding to the request. At process block 1806, the prompt is transmitted or sent to an AI system (e.g., one comprising one or more processors or data stores configured to generate data structures in response to received prompts) such as generative AI system 1808. In response to generative AI system 1808 generating and transmitting the generated XR content or objects to the e-commerce application, the e-commerce application receives generated content or objects for rendering at process block 1810, wherein the generated XR content or objects corresponds to supplemental content to influence the user's preference for at least one product of a retrieved list of products as provided by the e-commerce application in response to a user query for a list of products. At process block 1812, the e-commerce application stores the generated XR content or objects for re-use to subsequent user requests or user browsing sessions. The e-commerce application may store the generated content or objects in, for example, e-commerce application data store 1814, which may correspond to at least one server or processor communicatively accessible via the e-commerce application.

In some embodiments, the XR content or objects that are generated may correspond to a scream and a thunder clap in another room that then echoes throughout rooms with devices communicatively accessible via the device the prompt is generated from. For example, where there are holiday specials (e.g., Halloween special), an e-commerce application may create XR content to make the experience immersive based on the theme of the special. In some embodiments, XR content (e.g., one or more visual or audio data packages or structures) may be modified based on a targeted rendering device's capabilities (e.g., resolution capabilities, user focus, or processing speed). In some embodiments, although the spatial affects may be available, they may be suppressed during rendering based on a user preference of interaction. In another example of a themed experience (e.g., based on available supplemental content rendering devices), a user can modify their home browsing or shopping experience to correspond to a mall experience by requesting introductions of corresponding sound or imagery. Additionally, or alternatively, where one or more audio output devices comprise LED displays, the colors may be modified based on a theme, intensity, or other aspect of the XR experience to further immerse the user in the experience. The LED display rendering criteria may also be modified by current scrolling activity (e.g., a user is focused on a vender with a specific color scheme and the LED display is provided instructions to generate a light display corresponding to the vender's color scheme). One or more of the visual content, audio content, or XR content may be accessible or suppressible based on one or more flags raised or lowered by the source device, or other secondary devices, or user profile or preference data. In some embodiments, the flags may be raised or lowered based on instructions created in response to a prompt received by at least one generative AI engine.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:

1. A method comprising:
retrieving a list of products from a server based on at least one parameter of a query, wherein the list of products comprises a plurality of selectable icons;
identifying a first device corresponding to a source of the query;
determining the first device is communicatively coupled to at least one secondary device;
retrieving device information of the at least one secondary device, wherein the device information indicates the at least one secondary device comprises a primary audio device and a secondary audio device;
generating, using an artificial intelligence generative engine, supplemental content corresponding to one or more products represented by at least one selectable icon of the plurality of selectable icons based on the device information of the at least one secondary device, wherein the supplemental content comprises a first primary audio track for rendering on the primary audio device and a second auxiliary audio track for rendering on the secondary audio device;
determining that a portion of the list of products is displayed on the first device, wherein the portion of the list of products is a subset of the list of products;
comparing a position of the at least one selectable icon on the list of products to the subset of the list of products displayed on the first device;
determining, based on the comparing, that the position of the at least one selectable icon is one or more of located within a threshold distance of the subset of the list of products displayed or included in the subset of the list of products displayed;
transmitting instructions to the at least one secondary device to render the second auxiliary audio track of the supplemental content based on a weight assigned to the second auxiliary audio track that indicates the second auxiliary audio track is assigned a highest weight among a plurality of second auxiliary audio tracks; and
transmitting instructions to the primary audio device to render the first primary audio track.

2. The method of claim 1, wherein the supplemental content comprises one or more of audio content or visual content.

3. The method of claim 2, wherein:
the audio content comprises a plurality of audio tracks including a first primary audio track and a second auxiliary audio track;
the first primary audio track comprises a data structure with instructions for rendering on a primary audio device; and
the second auxiliary audio track comprises a data structure with instructions for rendering on a secondary audio device.

4. The method of claim 1, further comprising:
when the at least one selectable icon is included in the subset of the list of products being displayed, blending rendering of the first primary audio track via the primary audio device with rendering of the second auxiliary audio track via the secondary audio device based on instructions generated with the supplemental content.

5. The method of claim 2, wherein the visual content comprises one or more of an image, a video, or a display of lights.

6. The method of claim 1, wherein the device information comprises at least one data structure indicating the at least one secondary device is configured for one or more of image presentation, video presentation, or activating a display of light.

7. The method of claim 2, further comprising:
determining the at least one secondary device comprises a plurality of visual output devices, wherein a first visual output device of the visual output devices is a video presentation device and a second visual output device of the visual output devices is a device that generates a display of light based on received instructions;
determining the supplemental content comprises a video for rendering on the first visual output device and instructions for generating a display of light using the second visual output device;
in response to determining the position of the at least one selectable icon is within a threshold distance of the subset of the list of products being displayed, transmitting instructions to the second visual output device to generate the display of light; and
in response to determining the position of the at least one selectable icon is part of the subset of the list of products being displayed, transmitting instructions to the first visual output device to render the video for display on the first visual output device.

8. A system comprising:
a server;
at least one device for rendering supplemental content comprising one or more of audio content, visual content, or extended reality haptic-feedback content; and
a primary device communicatively coupled to the server, the device comprising processing circuitry configured to interface with processing circuitry of the server, wherein one or more of the processing circuitries are configured to execute instructions to:
retrieve a list of products from a server based on at least one parameter of a query, wherein the list of products comprises a plurality of selectable icons;
identify a first device corresponding to a source of the query;
determine the first device is communicatively coupled to at least one secondary device;
retrieve device information of the at least one secondary device, wherein the device information indicates the at least one secondary device comprises a primary audio device and a secondary audio device;
generate, using an artificial intelligence generative engine, supplemental content corresponding to one or more products represented by at least one selectable icon of the plurality of selectable icons based on the device information of the at least one secondary device, wherein the supplemental content comprises a first primary audio track for rendering on the primary audio device and a second auxiliary audio track for rendering on the secondary audio device;
determine that a portion of the list of products is displayed on the first device, wherein the portion of the list of products is a subset of the list of products;
compare a position of the at least one selectable icon on the list of products to the subset of the list of products displayed on the first device;
in response to determining, based on the comparing, that the position of the at least one selectable icon is one or more of located within a threshold distance of the subset of the list of products displayed or included in the subset of the list of products displayed, transmit instructions to the at least one secondary device to render the second auxiliary audio track of the supplemental content based on a weight assigned to the second auxiliary audio track that indicates the second auxiliary audio track is assigned a highest weight among a plurality of second auxiliary audio tracks and transmit instructions to the primary audio device to render the first primary audio track.

9. The system of claim 8, wherein the supplemental content comprises one or more of audio content or visual content.

10. The system of claim 9, wherein:
the audio content comprises a plurality of audio tracks including a first primary audio track and a second auxiliary audio track;
the first primary audio track comprises a data structure with instructions for rendering on a primary audio device; and
the second auxiliary audio track comprises a data structure with instructions for rendering on a secondary audio device.

11. The system of claim 8, wherein the processing circuitry is further configured to:
when the at least one selectable icon is included in the subset of the list of products being displayed, blend rendering of the first primary audio track via the primary audio device with rendering of the second auxiliary audio track via the secondary audio device based on instructions generated with the supplemental content.

12. The system of claim 9, wherein the visual content comprises one or more of an image, a video, or a display of lights.

13. The system of claim 8, wherein the device information comprises at least one data structure indicating the at least one secondary device is configured for one or more of image presentation, video presentation, or activating a display of light.

14. The system of claim 9, wherein the processing circuitry is further configured to:
determine the at least one secondary device comprises a plurality of visual output devices, wherein a first visual output device of the visual output devices is a video presentation device and a second visual output device of the visual output devices is a device that generates a display of light based on received instructions;
determine the supplemental content comprises a video for rendering on the first visual output device and instructions for generating a display of light using the second visual output device;
in response to determining the position of the at least one selectable icon is within a threshold distance of the subset of the list of products being displayed, transmit instructions to the second visual output device to generate the display of light; and
in response to determining the position of the at least one selectable icon is part of the subset of the list of products being displayed, transmit instructions to the first visual output device to render the video for display on the first visual output device.

* * * * *